US008942387B2

(12) United States Patent
Elko et al.

(10) Patent No.: US 8,942,387 B2
(45) Date of Patent: Jan. 27, 2015

(54) NOISE-REDUCING DIRECTIONAL MICROPHONE ARRAY

(75) Inventors: Gary W. Elko, Summit, NJ (US); Jens M. Meyer, Fairfax, VT (US); Tomas Fritz Gaensler, Warren, NJ (US)

(73) Assignee: MH Acoustics LLC, Summit, NJ (US)

( * ) Notice: Subject to any disclaimer, the term of this patent is extended or adjusted under 35 U.S.C. 154(b) by 1194 days.

(21) Appl. No.: 12/281,447

(22) PCT Filed: Mar. 9, 2007

(86) PCT No.: PCT/US2007/006093

§ 371 (c)(1), (2), (4) Date: Sep. 2, 2008

(87) PCT Pub. No.: WO2007/106399

PCT Pub. Date: Sep. 20, 2007

(65) Prior Publication Data

US 2009/0175466 A1 Jul. 9, 2009

Related U.S. Application Data

(63) Continuation-in-part of application No. PCT/US2006/044427, filed on Nov. 15, 2006, and a continuation-in-part of application No. 10/193,825, filed on Jul. 12, 2002, now Pat. No. 7,171,008.

(Continued)

(51) Int. Cl.
*H04B 15/00* (2006.01)
*H04R 3/00* (2006.01)

(Continued)

(52) U.S. Cl.
CPC .............. *H04R 3/005* (2013.01); *H04R 25/407* (2013.01); *G10L 2021/02166* (2013.01); *H04R 2410/07* (2013.01); *H04R 2430/20* (2013.01); *H04R 2430/21* (2013.01); *H04R 2430/23* (2013.01)
USPC ............................ 381/94.2; 381/94.1; 381/92

(58) Field of Classification Search
USPC ........................... 381/94.1, 94.2, 92.3, 92, 56
See application file for complete search history.

(56) References Cited

U.S. PATENT DOCUMENTS 3,626,365 A 12/1971 Press
4,281,551 A * 8/1981 Gaudriot et al. ................ 73/647

(Continued)

FOREIGN PATENT DOCUMENTS

EP 1 581 026 A1 9/2005
JP H06-269084 A 9/1994

(Continued)

OTHER PUBLICATIONS

Olson, HF (1946), Gradient Microphones. Journal of the Acoustic Society of America, vol. 17, No. 3, pp. 192-198.*

(Continued)

*Primary Examiner* — Duc Nguyen
*Assistant Examiner* — Kile Blair
(74) *Attorney, Agent, or Firm* — Mendelsohn, Drucker & Dunleavy, P.C.; Steve Mendelsohn

(57) ABSTRACT

In one embodiment, a directional microphone array having (at least) two microphones generates forward and backward cardioid signals from two (e.g., omnidirectional) microphone signals. An adaptation factor is applied to the backward cardioid signal, and the resulting adjusted backward cardioid signal is subtracted from the forward cardioid signal to generate a (first-order) output audio signal corresponding to a beampattern having no nulls for negative values of the adaptation factor. After low-pass filtering, spatial noise suppression can be applied to the output audio signal. Microphone arrays having one (or more) additional microphones can be designed to generate second- (or higher-) order output audio signals.

55 Claims, 15 Drawing Sheets

Related U.S. Application Data

(60) Provisional application No. 60/781,250, filed on Mar. 10, 2006, provisional application No. 60/737,577, filed on Nov. 17, 2005, provisional application No. 60/354,650, filed on Feb. 5, 2002.

(51) Int. Cl.
*H04R 25/00* (2006.01)
*G10L 21/0216* (2013.01)

(56) References Cited

U.S. PATENT DOCUMENTS

| | | | | | |
|---|---|---|---|---|---|
| 4,741,038 | A | | 4/1988 | Elko et al. | |
| 5,325,872 | A | | 7/1994 | Westermann | |
| 5,473,701 | A | * | 12/1995 | Cezanne et al. | |
| 5,515,445 | A | | 5/1996 | Baumhauer, Jr. et al. | |
| 5,524,056 | A | | 6/1996 | Killion et al. | |
| 5,602,962 | A | | 2/1997 | Kellermann | |
| 5,610,991 | A | | 3/1997 | Janse | |
| 5,687,241 | A | | 11/1997 | Ludvigsen | |
| 5,878,146 | A | | 3/1999 | Andersen | |
| 5,982,906 | A | * | 11/1999 | Ono | 381/94.2 |
| 6,041,127 | A | * | 3/2000 | Elko | 381/92 |
| 6,272,229 | B1 | | 8/2001 | Baekgaard | |
| 6,292,571 | B1 | | 9/2001 | Sjursen | |
| 6,339,647 | B1 | | 1/2002 | Andersen et al. | |
| 6,584,203 | B2 | * | 6/2003 | Elko et al. | |
| 6,668,062 | B1 | * | 12/2003 | Luo et al. | |
| 6,983,055 | B2 | | 1/2006 | Luo | |
| 7,242,781 | B2 | * | 7/2007 | Hou | |
| 7,577,262 | B2 | * | 8/2009 | Kanamori et al. | |
| 7,817,808 | B2 | * | 10/2010 | Konchitsky et al. | |
| 8,135,142 | B2 | | 3/2012 | Fischer et al. | |
| 2003/0031328 | A1 | * | 2/2003 | Elko et al. | 381/92 |
| 2003/0053646 | A1 | | 3/2003 | Nielsen et al. | |
| 2003/0147538 | A1 | | 8/2003 | Elko | 381/92 |
| 2003/0206640 | A1 | * | 11/2003 | Malvar et al. | 381/93 |
| 2004/0022397 | A1 | * | 2/2004 | Warren | 381/92 |
| 2004/0165736 | A1 | * | 8/2004 | Hetherington et al. | 381/94.3 |
| 2005/0276423 | A1 | | 12/2005 | Aubauer et al. | |
| 2006/0115103 | A1 | * | 6/2006 | Feng et al. | 381/313 |
| 2009/0175466 | A1 | * | 7/2009 | Elko et al. | 381/94.2 |
| 2009/0323982 | A1 | * | 12/2009 | Solbach et al. | 381/94.3 |
| 2010/0329492 | A1 | * | 12/2010 | Derleth et al. | 381/317 |

FOREIGN PATENT DOCUMENTS

| | | | | |
|---|---|---|---|---|
| JP | 06-303689 | | | 10/1994 |
| JP | 10023590 | A | * | 1/1998 |
| JP | 10126878 | A | * | 5/1998 |
| JP | 2001-124621 | | | 5/2001 |
| WO | WO9305503 | A1 | | 3/1993 |
| WO | WO95/16259 | A1 | | 6/1995 |
| WO | WO01/56328 | A1 | | 8/2001 |
| WO | WO01/69968 | A2 | | 9/2001 |
| WO | WO2006042540 | A1 | | 4/2006 |

OTHER PUBLICATIONS

F. Luo, J. Yang, C. Pavlovic, and A. Nehorai, "Adaptive null-forming scheme in digital hearing aids", IEEE Trans. Signal Process., vol. 50, pp. 1583-1590, 2002.*

Gary W. Elko et al ., "*A simple adaptive first-order differential microphone*," IEEE ASSP Workshop on New Paltz, NY, Oct. 15-18, 1995, XP010154658, 4 pages.

Markus Buck, "*Aspects of First-Order Differential Microphone Arrays in the Presence of Sensor Imperfections*," European Transactions on Telecommunications, Wiley & Sons, Chichester, GB, vol. 13, No. 2, Mar. 2002, XP001123749, pp. 115-122.

Sven Fischer et al., "*Beamforming microphone arrays for speech acquisition in noisy environments*," Speech Communication, Elsevier Science Publishers, Amsterdam, NL, vol. 20, No. 3, Dec. 1996, XP004016546, pp. 215-227.

Restriction Requirement; Mailed Mar. 24, 2011 for corresponding U.S. Appl. No. 12/089,545.

Non-Final Office Action; Mailed Jun. 22, 2011 for corresponding U.S. Appl. No. 12/089,545.

Notice of Allowance; Mailed Sep. 21, 2011 for corresponding U.S. Appl. No. 12/089,545.

Restriction Requirement; Mailed Jan. 16, 2006 for the corresponding U.S. Appl. No. 10/193,825.

Non-Final Office Action; Mailed May 17, 2006 for the corresponding U.S. Appl. No. 10/193,825.

Notice of Allowance; Mailed Oct. 16, 2006 for the corresponding U.S. Appl. No. 10/193,825.

Communication Pursuant to Article 94(3) EPC; Mailed Mar. 30, 2012 for corresponding EP Application No. 07 752 770.3.

Eargle, J.; "The Microphone Book"; 2nd Ed.; Focal Press; 2004; pp. 82-85.

Communication Pursuant to Article 94(3) EPC; Mailed Jul. 5, 2012 for corresponding EP Application No. 07 752 770.3.

* cited by examiner

600

1200

1500

1600

1700

1800

NOISE-REDUCING DIRECTIONAL MICROPHONE ARRAY

CROSS-REFERENCE TO RELATED APPLICATIONS

This application is a continuation-in-part of PCT patent application no. PCT/US06/44427, filed on Nov. 15, 2006, which (i) claimed the benefit of the filing date of U.S. provisional application No. 60/737,577, filed on Nov. 17, 2005, and (ii) was itself a continuation-in-part of U.S. patent application Ser. No. 10/193,825, filed on Jul. 12, 2002 and issued on Jan. 30, 2007 as U.S. Pat. No. 7,171,008, which claimed the benefit of the filing date of U.S. provisional application No. 60/354,650, filed on Feb. 5, 2002, the teachings of all of which are incorporated herein by reference. This application also claims the benefit of the filing date of U.S. provisional application No. 60/781,250, filed on Mar. 10, 2006 the teachings of which are incorporated herein by reference.

BACKGROUND OF THE INVENTION

1. Field of the Invention

The present invention relates to acoustics, and, in particular, to techniques for reducing wind-induced noise in microphone systems, such as those in hearing aids and mobile communication devices, such as laptop computers and cell phones.

2. Description of the Related Art

Wind-induced noise in the microphone signal input to mobile communication devices is now recognized as a serious problem that can significantly limit communication quality. This problem has been well known in the hearing aid industry, especially since the introduction of directionality in hearing aids.

Wind-noise sensitivity of microphones has been a major problem for outdoor recordings. Wind noise is also now becoming a major issue for users of directional hearing aids as well as cell phones and hands-free headsets. A related problem is the susceptibility of microphones to the speech jet, or flow of air from the talker's mouth. Recording studios typically rely on special windscreen socks that either cover the microphone or are placed between the talker and the microphone. For outdoor recording situations where wind noise is an issue, microphones are typically shielded by windscreens made of a large foam or thick fuzzy material. The purpose of the windscreen is to eliminate the airflow over the microphone's active element, but allow the desired acoustic signal to pass without any modification.

SUMMARY OF THE INVENTION

Certain embodiments of the present invention relate to a technique that combines a constrained microphone adaptive beamformer and a multichannel parametric noise suppression scheme to allow for a gradual transition from (i) a desired directional operation when noise and wind conditions are benign to (ii) non-directional operation with increasing amount of wind-noise suppression as the environment tends to higher wind-noise conditions.

In one possible implementation, the technique combines the operation of a constrained adaptive two-element differential microphone array with a multi-microphone wind-noise suppression algorithm. The main result is the combination of these two technological solutions. First, a two-element adaptive differential microphone is formed that is allowed to adjust its directional response by automatically adjusting its beampattern to minimize wind noise. Second, the adaptive beamformer output is fed into a multichannel wind-noise suppression algorithm. The wind-noise suppression algorithm is based on exploiting the knowledge that wind-noise signals are caused by convective airflow whose speed of propagation is much less than that of desired propagating acoustic signals. It is this unique combination of both a constrained two-element adaptive differential beamformer with multichannel wind-noise suppression that offers an effective solution for mobile communication devices in varying acoustic environments.

In one embodiment, the present invention is a method for processing audio signals. First and second cardioid signals are generated from first and second microphone signals. A first adaptation factor is generated and applied to the second (e.g., backward) cardioid signal to generate an adapted second cardioid signal. The first (e.g., forward) cardioid signal and the adapted second cardioid signal are combined to generate a first output audio signal corresponding to a first beampattern having no nulls for at least one value of the first adaptation factor.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Differential Microphone Arrays

A differential microphone is a microphone that responds to spatial differentials of a scalar acoustic pressure field. The order of the differential components that the microphone responds to denotes the order of the microphone. Thus, a microphone that responds to both the acoustic pressure and the first-order difference of the pressure is denoted as a first-order differential microphone. One requisite for a microphone to respond to the spatial pressure differential is the implicit constraint that the microphone size is smaller than the acoustic wavelength. Differential microphone arrays can be seen directly analogous to finite-difference estimators of continuous spatial field derivatives along the direction of the microphone elements. Differential microphones also share strong similarities to superdirectional arrays used in electromagnetic antenna design. The well-known problems with implementation of superdirectional arrays are the same as those encountered in the realization of differential microphone arrays. It has been found that a practical limit for differential microphones using currently available transducers is at third-order. See G. W. Elko, "Superdirectional Microphone Arrays," *Acoustic Signal Processing for Telecommunication*, Kluwer Academic Publishers, Chapter 10, pp. 181-237, March, 2000, the teachings of which are incorporated herein by reference and referred to herein as "Elko-1."

First-Order Dual-Microphone Array

Figure 1:
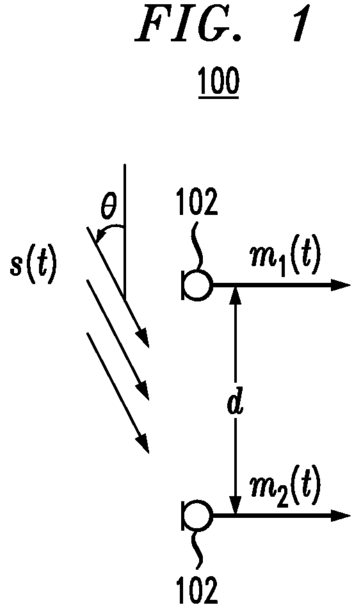
FIG. 1 illustrates a first-order differential microphone.

FIG. 1 illustrates a first-order differential microphone 100 having two closely spaced pressure (i.e., omnidirectional) microphones 102 spaced at a distance d apart, with a plane wave s(t) of amplitude $S_o$ and wavenumber k incident at an angle θ from the axis of the two microphones.

The output $m_i(t)$ of each microphone spaced at distance d for a time-harmonic plane wave of amplitude $S_o$ and frequency ωincident from angle θ can be written according to the expressions of Equation (1) as follows:

$$m_1(t)=S_o e^{j\omega t-jkd\cos(\theta)/2}$$

$$m_2(t)=S_o e^{j\omega t+jkd\cos(\theta)/2} \qquad (1)$$

The output E(θ,t) of a weighted addition of the two microphones can be written according to Equation (2) as follows:

$$\begin{aligned} E(\theta,t) &= w_1 m_1(t) + w_2 m_2(t) \qquad (2)\\ &= S_o e^{j\omega t}[(w_1+w_2)+(w_1-w_2)jkd\cos(\theta)/2 + h.o.t.] \end{aligned}$$

where $w_1$ and $w_2$ are weighting values applied to the first and second microphone signals, respectively.

Figure 2:
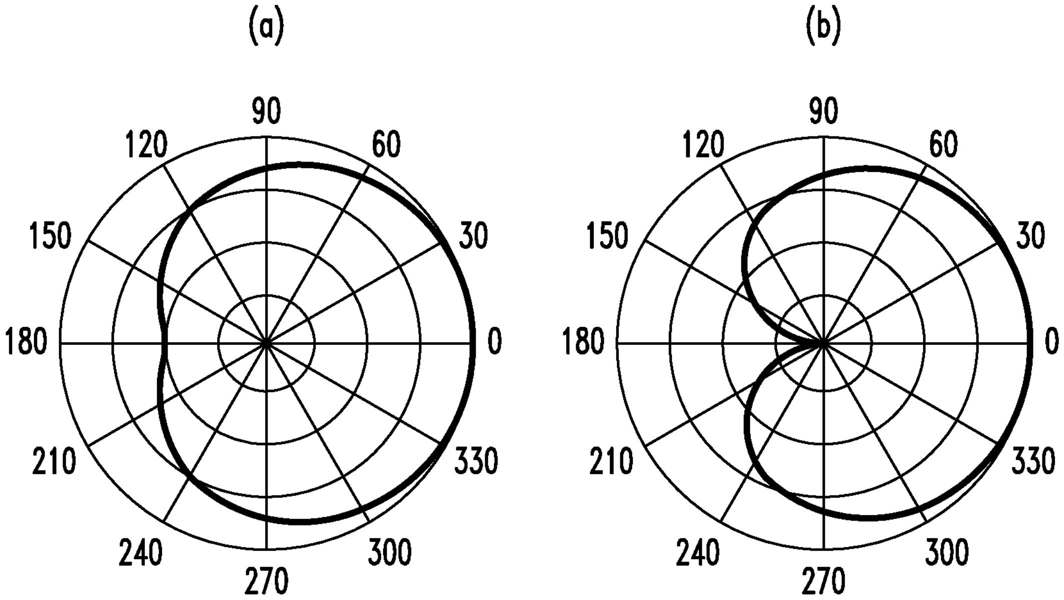
FIG. 2(*a*) shows a directivity plot for a first-order array having no nulls, while FIG. 2(*b*) shows a directivity plot for a first-order array having one null.

If kd<<π, then the higher-order terms ("h.o.t." in Equation (2)) can be neglected. If $w_1=-w_2$, then we have the pressure difference between two closely spaced microphones. This specific case results in a dipole directivity pattern cos(θ) as can easily be seen in Equation (2). However, any first-order differential microphone pattern can be written as the sum of a zero-order (omnidirectional) term and a first-order dipole term (cos(θ)). A first-order differential microphone implies that $w_1 \approx -w_2$. Thus, a first-order differential microphone has a normalized directional pattern E that can be written according to Equation (3) as follows:

$$E(\theta)=\alpha\pm(1-\alpha)\cos(\theta) \qquad (3)$$

where typically 0≤α≤1, such that the response is normalized to have a maximum value of 1 at θ=0, and for generality, the ± indicates that the pattern can be defined as having a maximum either at θ=0 or θ=π. One implicit property of Equation (3) is that, for 0≤α≤1, there is a maximum at θ=0 and a minimum at an angle between π/2 and π. For values of 0.5<α≤1, the response has a minimum at π, although there is no zero in the response. A microphone with this type of directivity is typically called a "sub-cardioid" microphone. FIG. 2(*a*) shows an example of the response for this case. In particular, FIG. 2(*a*) shows a directivity plot for a first-order array, where α=0.55.

When α=0.5, the parametric algebraic equation has a specific form called a cardioid. The cardioid pattern has a zero response at θ=180°. For values of 0≤α≤0.5, there is a null at:

$$\theta_{null} = \cos^{-1}\frac{\alpha}{\alpha-1}. \qquad (4)$$

FIG. 2(*b*) shows a directional response corresponding to α=0.5 which is the cardioid pattern. The concentric rings in the polar plots of FIGS. 2(*a*) and 2(*b*) are 10 dB apart.

A computationally simple and elegant way to form a general first-order differential microphone is to form a scalar combination of forward-facing and backward-facing cardioid signals. These signals can be obtained by using both solutions in Equation (3) and setting α=0.5. The sum of these two cardioid signals is omnidirectional (since the cos(θ) terms subtract out), and the difference is a dipole pattern (since the constant term α subtracts out).

Figure 3:
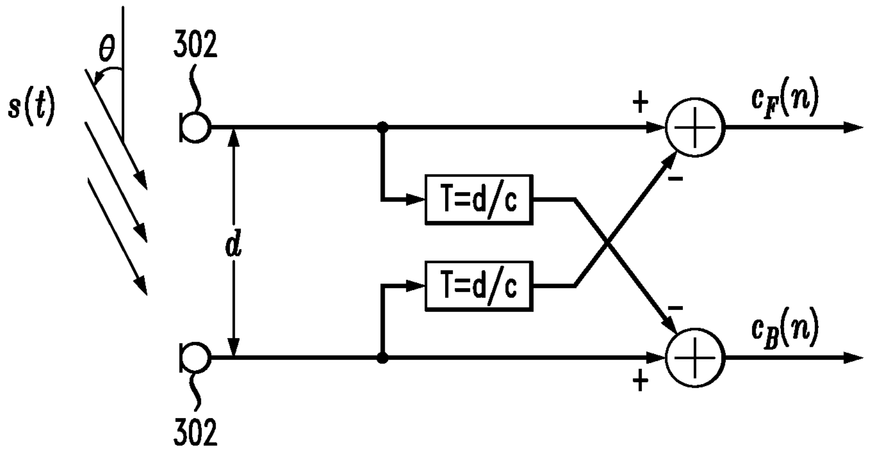
FIG. 3 shows a combination of two omnidirectional microphone signals to obtain back-to-back cardioid signals.

FIG. 3 shows a combination of two omnidirectional microphones 302 to obtain back-to-back cardioid microphones. The back-to-back cardioid signals can be obtained by a simple modification of the differential combination of the omnidirectional microphones. See U.S. Pat. No. 5,473,701, the teachings of which are incorporated herein by reference. Cardioid signals can be formed from two omnidirectional microphones by including a delay (T) before the subtraction (which is equal to the propagation time (dlc) between microphones for sounds impinging along the microphone pair axis).

Figure 4:
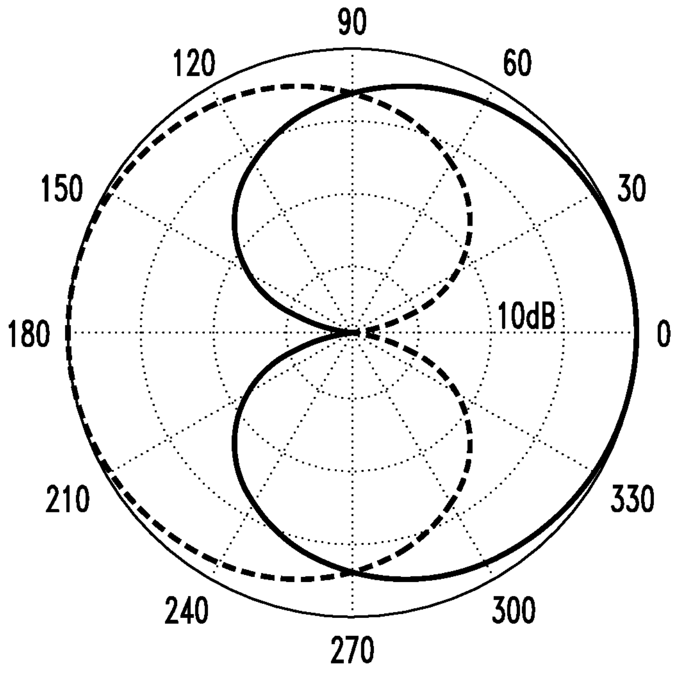
FIG. 4 shows directivity patterns for the back-to-back cardioids of FIG. 3.

FIG. 4 shows directivity patterns for the back-to-back cardioids of FIG. 3. The solid curve is the forward-facing cardioid, and the dashed curve is the backward-facing cardioid.

A practical way to realize the back-to-back cardioid arrangement shown in FIG. 3 is to carefully choose the spacing between the microphones and the sampling rate of the A/D converter to be equal to some integer multiple of the required delay. By choosing the sampling rate in this way, the cardioid signals can be made simply by combining input signals that are offset by an integer number of samples. This approach removes the additional computational cost of interpolation filtering to obtain the required delay, although it is relatively simple to compute the interpolation if the sampling rate cannot be easily set to be equal to the propagation time of sound between the two sensors for on-axis propagation.

By combining the microphone signals defined in Equation (1) with the delay and subtraction as shown in FIG. 3, a forward-facing cardioid microphone signal can be written according to Equation (5) as follows:

$$C_F(kd,\theta)=-2jS_o\sin(kd[1+\cos\theta]/2). \quad (5)$$

Similarly, the backward-facing cardioid microphone signal can similarly be written according to Equation (6) as follows:

$$C_B(kd,\theta)=-2jS_o\sin(kd[1-\cos\theta]/2). \quad (6)$$

If both the forward-facing and backward-facing cardioids are averaged together, then the resulting output is given according to Equation (7) as follows:

$$E_{c\text{-}omni}(kd,\theta)=1/2[C_F(kd,\theta)+C_B(kd,\theta)]=-2jS_o\sin(kd/2)\cos([kd/2]\cos\theta). \quad (7)$$

For small kd, Equation (7) has a frequency response that is a first-order high-pass, and the directional pattern is omnidirectional.

The subtraction of the forward-facing and backward-facing cardioids yields the dipole response of Equation (8) as follows:

$$E_{c\text{-}dipole}(kd,\theta)=C_F(kd,\theta)-C_B(kd,\theta)=-2jS_o\cos(kd/2)\sin([kd/2]\cos\theta). \quad (8)$$

A dipole constructed by simply subtracting the two pressure microphone signals has the response given by Equation (9) as follows:

$$E_{dipole}(kd,\theta)=-2jS_o\sin([kd/2]\cos\theta). \quad (9)$$

One observation to be made from Equation (8) is that the dipole's first zero occurs at twice the value (kd=2π) of the cardioid-derived omnidirectional and cardioid-derived dipole term (kd=π) for signals arriving along the axis of the microphone pair.

Figure 5:
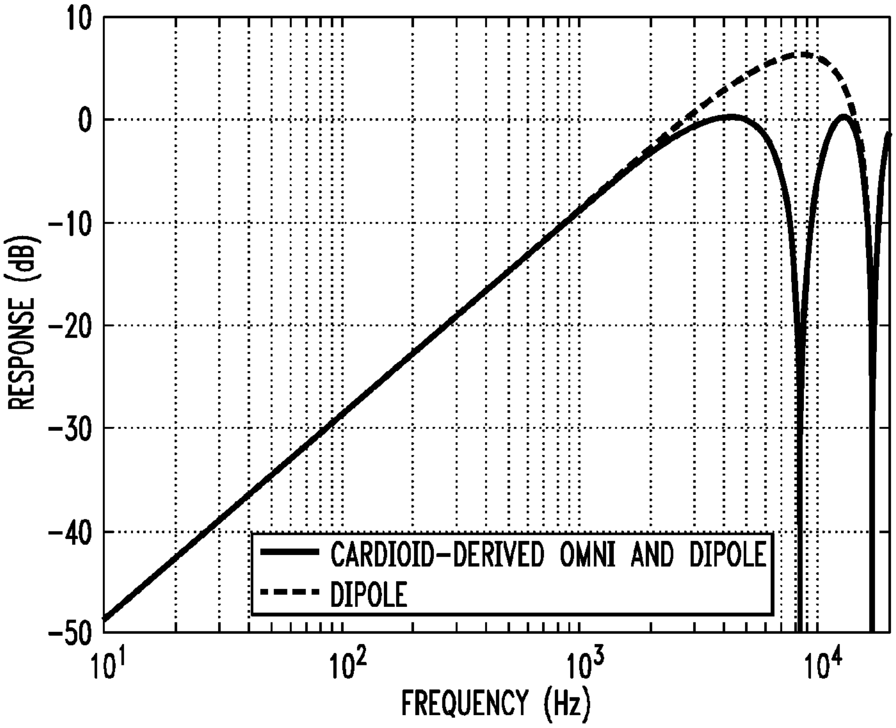
FIG. 5 shows the frequency responses for signals incident along a microphone pair axis for a dipole microphone, a cardioid-derived dipole microphone, and a cardioid-derived omnidirectional microphone.

FIG. 5 shows the frequency responses for signals incident along the microphone pair axis (θ=0) for a dipole microphone, a cardioid-derived dipole microphone, and a cardioid-derived omnidirectional microphone. Note that the cardioid-derived dipole microphone and the cardioid-derived omnidirectional microphone have the same frequency response. In each case, the microphone-element spacing is 2 cm. At this angle, the zero occurs in the cardioid-derived dipole term at the frequency where kd=2π.

Adaptive Differential Beamformer

Figure 6:
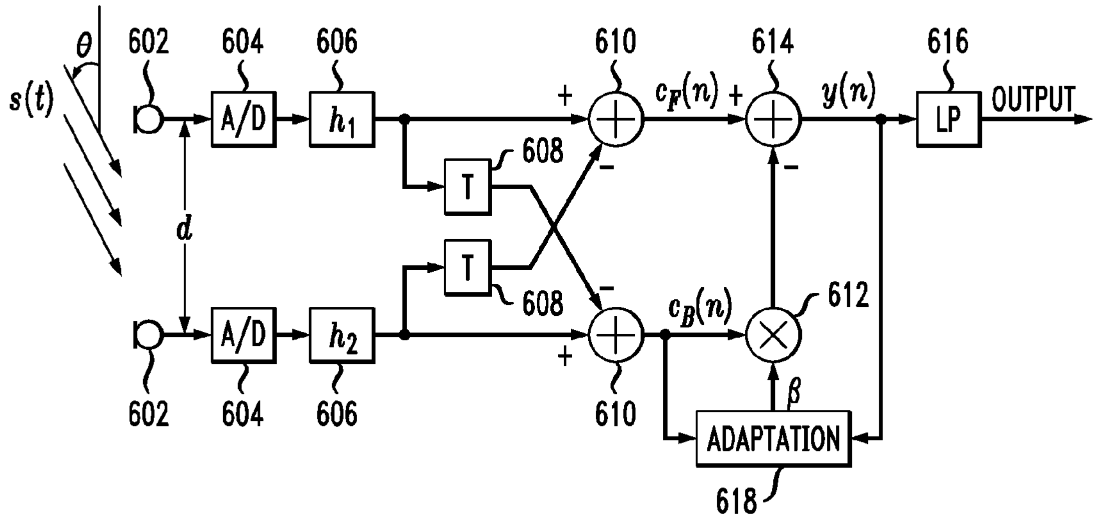
FIG. 6 shows a block diagram of an adaptive differential microphone.

FIG. 6 shows the configuration of an adaptive differential microphone 600 as introduced in G. W. Elko and A. T. Nguyen Pong, "A simple adaptive first-order differential microphone," Proc. 1995 IEEE ASSP Workshop on Applications of Signal Proc. to Audio and Acoustics, October 1995, referred to herein as "Elko-2." As represented in FIG. 6, a plane-wave signal s(t) arrives at two omnidirectional microphones 602 at an angle θ. The microphone signals are sampled at the frequency 1/T by analog-to-digital (A/D) converters 604 and filtered by anti-aliasing low-pass filters 606. In the following stage, delays 608 and subtraction nodes 610 form the forward and backward cardioid signals $C_F(n)$ and $C_B(n)$ by subtracting one delayed microphone signal from the other undelayed microphone signal. As mentioned previously, one can carefully select the spacing d and the sampling rate 1/T such that the required delay for the cardioid signals is an integer multiple of the sampling rate. However, in general, one can always use an interpolation filter (not shown) to form any general required delay although this will require more computation. Multiplication node 612 and subtraction node 614 generate the unfiltered output signal y(n) as an appropriate linear combination of $C_F(n)$ and $C_B(n)$. The adaptation factor (i.e., weight parameter) β applied at multiplication node 612 allows a solitary null to be steered in any desired direction. With the frequency-domain signal $S(j\omega)=\Sigma_{n=-\infty}^{\infty}s(nT)e^{-jkdn}$, the frequency-domain signals of Equations (10) and (11) are obtained as follows:

$$C_F(j\omega,d)=S(j\omega)\cdot\left[e^{j\frac{kd}{2}\cos\theta}-e^{-kd\left(1+\frac{\cos\theta}{2}\right)}\right],\quad (10)$$
$$C_B(j\omega,d)=S(j\omega)\cdot\left[e^{-j\frac{kd}{2}\cos\theta}-e^{-kd\left(1-\frac{\cos\theta}{2}\right)}\right]$$

and hence $$Y(j\omega,d)=e^{-j\frac{kd}{2}}\cdot 2j\cdot S(j\omega)\cdot\left[\sin\left(\frac{kd}{2}(1+\cos\theta)\right)-\beta\sin\left(\frac{kd}{2}(1-\cos\theta)\right)\right].\quad (11)$$

A desired signal S(jω) arriving from straight on (θ=0) is distorted by the factor | sin(kd)|. For a microphone used for a frequency range from about kd=2π·100 Hz·T to kd=π/2, first-order recursive low-pass filter 616 can equalize the mentioned distortion reasonably well. There is a one-to-one relationship between the adaptation factor β and the null angle $\theta_n$ as given by Equation (12) as follows:

$$\beta=\frac{\sin\frac{kd}{2}(1+\cos\theta_n)}{\sin\frac{kd}{2}(1-\cos\theta_n)}.\quad (12)$$

Since it is expected that the sound field varies, it is of interest to allow the first-order microphone to adaptively compute a response that minimizes the output under a constraint that signals arriving from a selected range of direction are not impacted. An LMS or Stochastic Gradient algorithm is a commonly used adaptive algorithm due to its simplicity and ease of implementation. An LMS algorithm for the back-to-back cardioid adaptive first-order differential array is given in U.S. Pat. No. 5,473,701 and in Elko-2, the teachings of both of which are incorporated herein by reference.

Subtraction node 614 generates the unfiltered output signal y(n) according to Equation (13) as follows:

$$y(t)=c_F(t)-\beta c_B(t). \quad (13)$$

Squaring Equation (13) results in Equation (14) as follows:

$$y^2(t)=c_F^2(t)-2\beta c_F(t)c_B(t)+\beta^2c_B(t). \quad (14)$$

The steepest-descent algorithm finds a minimum of the error surface $E[y^2(t)]$ by stepping in the direction opposite to the gradient of the surface with respect to the adaptive weight parameter β. The steepest-descent update equation can be written according to Equation (15) as follows:

$$\beta_{t+1}=\beta_t-\mu\frac{dE[y^2(t)]}{d\beta}\quad (15)$$

where μ is the update step-size and the differential gives the gradient of the error surface $E[y^2(t)]$ with respect to β. The quantity that we want to minimize is the mean of $y^2(t)$ but the LMS algorithm uses the instantaneous estimate of the gradient. In other words, the expectation operation in Equation (15) is not applied and the instantaneous estimate is used. Performing the differentiation yields Equation (16) as follows:

$$\frac{dy^2(t)}{d\beta} = -2c_F(t)c_B(t) + 2\beta c_B^2(t) = -2y(t)c_B(t). \quad (16)$$

Thus, we can write the LMS update equation according to Equation (17) as follows:

$$\beta_{t+1}=\beta_t+2\mu y(t)c_B(t). \quad (17)$$

Typically the LMS algorithm is slightly modified by normalizing the update size and adding a regularization constant $\epsilon$. Normalization allows explicit convergence bounds for $\mu$ to be set that are independent of the input power. Regularization stabilizes the algorithm when the normalized input power in $c_B$ becomes too small. The LMS version with a normalized $\mu$ is therefore given by Equation (18) as follows:

$$\beta_{t+1} = \beta_t + 2\mu y(t)\frac{c_B(t)}{< c_B^2(t) > +\varepsilon} \quad (18)$$

where the brackets ("<.>") indicate a time average. One practical issue occurs when there is a desired signal arriving at only $\theta=0$. In this case, $\beta$ becomes undefined. A practical way to handle this case is to limit the power ratio of the forward-to-back cardioid signals. In practice, limiting this ratio to a factor of 10 is sufficient.

The intervals $\beta\epsilon[0,1]$ and $\beta\epsilon[1,\infty)$ are mapped onto $\theta\epsilon[0.5\pi,\pi)]$ and $\theta\epsilon[0,0.5\pi]$, respectively. For negative $\beta$, the directivity pattern does not contain a null. Instead, for small $|\beta|$ with $-1<\beta<0$, a minimum occurs at $\theta=\pi$; the depth of which reduces with growing $|\beta|$. For $\beta=-1$, the pattern becomes omnidirectional and, for $\beta<-1$, the rear signals become amplified. An adaptive algorithm 618 chooses $\beta$ such that the energy of y(n) in a certain exponential or sliding window becomes a minimum. As such, $\beta$ should be constrained to the interval [−1,1]. Otherwise, a null may move into the front half plane and suppress the desired signal. For a pure propagating acoustic field (no wind or self-noise), it can be expected that the adaptation selects a $\beta$ equal to or bigger than zero. For wind and self-noise, it is expected that $-1\leq\beta<0$. An observation that $\beta$ would tend to values of less than 0 indicates the presence of uncorrelated signals at the two microphones. Thus, one can also use $\beta$ to detect (1) wind noise and conditions where microphone self-noise dominates the input power to the microphones or (2) coherent signals that have a propagation speed much less than the speed of sound in the medium (such as coherent convected turbulence).

It should be clear that acoustic fields can be comprised of multiple simultaneous sources that vary in time and frequency. As such, U.S. Pat. No. 5,473,701 proposed that the adaptive beamformer be implemented in frequency subbands. The realization of a frequency-dependent null or minimum location is now straightforward. We replace the factor $\beta$ by a filter with a frequency response $H(j\omega)$ that is real and not bigger than one. The impulse response h(n) of such a filter is symmetric about the origin and hence noncausal. This involves the insertion of a proper delay d in both microphone paths.

Figure 7:
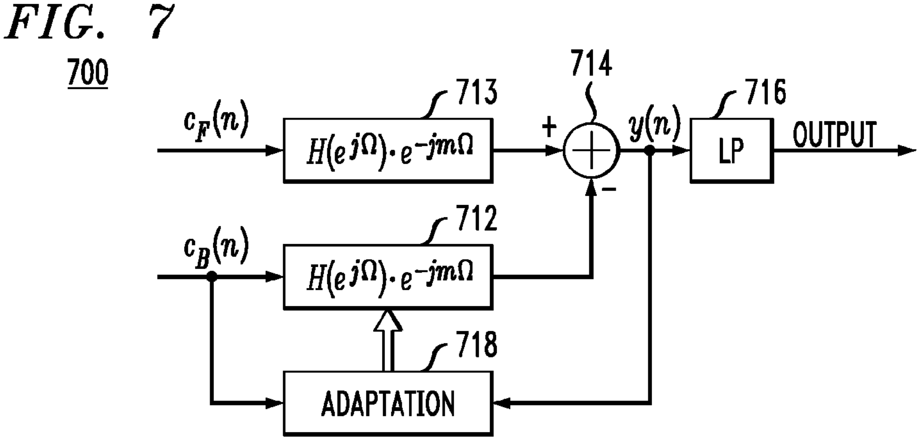
FIG. 7 shows a block diagram of the back end of a frequency-selective adaptive first-order differential microphone.

FIG. 7 shows a block diagram of the back end 700 of a frequency-selective first-order differential microphone. In FIG. 7, subtraction node 714, low-pass filter 716, and adaptation block 718 are analogous to subtraction node 614, low-pass filter 616, and adaptation block 618 of FIG. 6. Instead of multiplication node 612 applying adaptive weight factor $\beta$, filters 712 and 713 decompose the forward and backward cardioid signals as a linear combination of bandpass filters of a uniform filterbank. The uniform filterbank is applied to both the forward cardioid signal $c_F(n)$ and the backward cardioid signal $c_B(n)$, where m is the subband index number and $\Omega$ is the frequency.

In the embodiment of FIG. 7, the forward and backward cardioid signals are generated in the time domain, as shown in FIG. 6. The time-domain cardioid signals are then converted into a subband domain, e.g., using a multichannel filterbank, which implements the processing of elements 712 and 713. In this embodiment, a different adaptation factor $\beta$ is generated for each different subband, as indicated in FIG. 7 by the "thick" arrow from adaptation block 718 to element 713.

In principle, we could directly use any standard adaptive filter algorithm (LMS, FAP, FTF, RLS . . . ) for the adjustment of h(n), but it would be challenging to easily incorporate the constraint $H(j\omega)\leq1$. Therefore and in view of a computationally inexpensive solution, we realize $H(j\omega)$ as a linear combination of band-pass filters of a uniform filterbank. The filterbank consists of M complex band-passes that are modulated versions of a low-pass filter $W(j\omega)$. That filter is commonly referred to as prototype filter. See R. E. Crochiere and L. R. Rabiner, *Multirate Digital Signal Processing*, Prentice Hall, Englewood Cliffs, N.J., (1983), and P. P. Vaidyanathan, *Multirate Systems and Filter Banks*, Prentice Hall, Englewood Cliffs, N.J., (1993), the teachings of both of which are incorporated herein by reference. Since h(n) and $H(j\omega)$ have to be real, we combine band-passes with conjugate complex impulse responses. For reasons of simplicity, we choose M as a power of two so that we end up with M/2+1 channels. The coefficients $\beta_0, \beta_1, \ldots \beta_{K/2}$ control the position of the null or minimum in the different subbands. The $\beta_u$'s form a linear combiner and will be adjusted by an NLMS-type algorithm.

It is desirable to design $W(j\omega)$ such that the constraint $H(j\omega)\leq1$ will be met automatically for all frequencies kd, given all coefficients $\beta_u$ are smaller than or equal to one. The heuristic NLMS-type algorithm of the following Equations (19)-(21) is apparent:

$$y(n) = c_F(n-m) - \sum_{\mu=0}^{M/2} \beta_\mu(n)\cdot v_\mu(n) \quad (19)$$

$$\tilde{\beta}_\mu(n+1) = \beta_\mu(n) + \alpha\cdot y(n)\cdot\frac{v_\mu(n)}{\sum_{v=0}^{M/2} v_v^2(n)} \quad (20)$$

$$\beta_\mu(n+1) = \begin{cases} \tilde{\beta}_\mu(n+1) & \text{for } \tilde{\beta}_\mu(n+1)\leq 1, \\ 1 & \text{for } \tilde{\beta}_\mu(n+1) > 1. \end{cases} \quad (21)$$

It is by no means straightforward that this algorithm always converges to the optimum solution, but simulations and real time implementations have shown its usefulness.

Optimum $\beta$ for Acoustic Noise Fields

The back-to-back cardioid power and cross-power can be related to the acoustic pressure field statistics. Using FIG. 6, the optimum value (in terms on the minimizing the mean-square output power) of $\beta$ can be found in terms of the acoustic pressures $p_1$ and $p_2$ at the microphone inputs according to Equation (22) as follows:

$$\beta_{opt} = \frac{2R_{12}(0) - R_{11}(T) - R_{22}(T)}{R_{11}(0) + R_{22}(0) - 2R_{12}(T)} \tag{22}$$

where $R_{12}$ is the cross-correlation function of the acoustic pressures and $R_{11}$ and $R_{22}$ are the acoustic pressure auto-correlation functions.

For an isotropic noise field at frequency ω, the cross-correlation function $R_{12}$ of the acoustic pressures $p_1$ and $p_2$ at the two sensors 102 of FIG. 1 is given by Equation (23) as follows:

$$R_{12}(\tau, d) = \frac{\sin kd}{kd}\cos(\omega\tau) \tag{23}$$

and the acoustic pressure auto-correlation functions are given by Equation (24) as follows:

$$R_{11}(\tau) = R_{22}(\tau) = \cos(\omega\tau), \tag{24}$$

where τ is time and k is the acoustic wavenumber.

For ωT=kd, $\beta_{opt}$ is determined by substituting Equations (23) and (24) into Equation (22), yielding Equation (25) as follows:

$$\beta_{opt} = 2\frac{kd\cos(kd) - \sin(kd)}{\sin(2kd) - 2kd}. \tag{25}$$

For small kd, kd<<π/2, Equation (25) approaches the value of β=0.5. For the value of β=0.5, the array response is that of a hypercardioid, i.e., the first-order array that has the highest directivity index, which corresponds to the minimum power output for all first-order arrays in an isotropic noise field.

Due to electronics, both wind noise and self-noise have approximately $1/f^2$ and 1/f spectral shapes, respectively, and are uncorrelated between the two microphone channels (assuming that the microphones are spaced at a distance that is larger than the turbulence correlation length of the wind). From this assumption, Equation (22) can be reduced to Equation (26) as follows:

$$\beta_{opt} \approx \frac{-R_{11}(T) - R_{22}(T)}{R_{11}(0) + R_{22}(0)}. \tag{26}$$

It may seem redundant to include both terms in the numerator and the denominator in Equation (26), since one might expect the noise spectrum to be similar for both microphone inputs since they are so close together. However, it is quite possible that only one microphone element is exposed to the wind or turbulent jet from a talker's mouth, and, as such, it is better to keep the expression more general. A simple model for the electronics and wind-noise signals would be the output of a single-pole low-pass filter operating on a wide-sense-stationary white Gaussian signal. The low-pass filter h(t) can be written as Equation (27) as follows:

$$h(t) = e^{-\alpha t}U(t) \tag{27}$$

where U(t) is the unit step function, and α is the time constant associated with the low-pass cutoff frequency. The power spectrum S(ω) can thus be written according to Equation (28) as follows:

$$S(\omega) = \frac{1}{\alpha^2 + \omega^2} \tag{28}$$

and the associated autocorrelation function R(τ) according to Equation (29) as follows:

$$R(\tau) = \frac{e^{-\alpha|\tau|}}{2\alpha} \tag{29}$$

A conservative assumption would be to assume that the low-frequency cutoff for wind and electronic noise is approximately 100 Hz. With this assumption, the time constant α is 10 milliseconds. Examining Equations (26) and (29), one can observe that, for small spacing (d on the order of 2 cm), the value of T≈60μ seconds, and thus R(T)≤1. Thus, $$\beta_{opt\text{-}noise} = -1 \tag{30}$$

Equation (30) is also valid for the case of only a single microphone exposed to the wind noise, since the power spectrum of the exposed microphone will dominate the numerator and denominator of Equation (26). Actually, this solution shows a limitation of the use of the back-to-back cardioid arrangement for this one limiting case. If only one microphone was exposed to the wind, the best solution is obvious: pick the microphone that does not have any wind contamination. A more general approach to handling asymmetric wind conditions is described in the next section.

From the results given in Equation (30), it is apparent that, to minimize wind noise, microphone thermal noise, and circuit noise in a first-order differential array, one should allow the differential array to attain an omnidirectional pattern. At first glance, this might seem counterintuitive since an omnidirectional pattern will allow more spatial noise into the microphone output. However, if this spatial noise is wind noise, which is known to have a short correlation length, an omnidirectional pattern will result in the lowest output power as shown by Equation (30). Likewise, when there is no or very little acoustic excitation, only the uncorrelated microphone thermal and electronic noise is present, and this noise is also minimized by setting β≈−1, as derived in Equation (30).

Asymmetric Wind Noise

Figure 8:
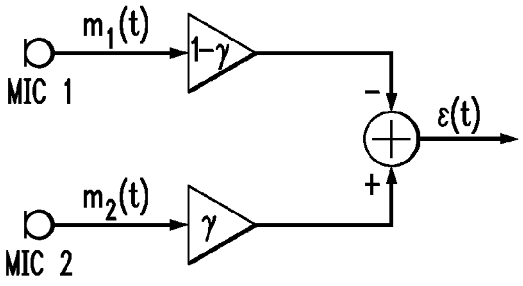
FIG. 8 shows a linear combination of microphone signals to minimize the output power when wind noise is detected.

As mentioned at the end of the previous section, with asymmetric wind noise, there is a solution where one can process the two microphone signals differently to attain a higher SNR output than selecting β=−1. One approach, shown in FIG. 8, is to linearly combine the microphone signals $m_1(t)$ and $m_2(t)$ to minimize the output power when wind noise is detected. The combination of the two microphone signals is constrained so that the overall sum gain of the two microphone signals is set to unity. The combined output ϵ(t) can be written according to Equation (31) as follows:

$$\epsilon(t) = \gamma m_2(t) - (1-\gamma)m_1(t) \tag{31}$$

where γ is a combining coefficient whose value is between 0 and 1, inclusive.

Squaring the combined output ϵ(t) of Equation (31) to compute the combined output power $\epsilon^2$ yields Equation (32) as follows:

$$\epsilon^2 = \gamma^2 m_2^2(t) - 2\gamma(1-\gamma)m_1(t)m_2(t) + (1-\gamma)^2 m_1^2(t) \tag{32}$$

Taking the expectation of Equation (32) yields Equation (33) as follows:

$$\epsilon = \gamma^2 R_{22}(0) - 2\gamma(1-\gamma)R_{12}(0) + (1-\gamma)^2 R_{11}(0) \tag{33}$$

where $R_{11}(0)$ and $R_{22}(0)$ are the autocorrelation functions for the two microphone signals of Equation (1), and $R_{12}(0)$ is the cross-correlation function between those two microphone signals.

Assuming uncorrelated inputs, where $R_{12}(0)=0$, Equation (33) simplifies to Equation (34) as follows:

$$\epsilon=\gamma^2 R_{22}(0)+(1-\gamma)^2 R_{11}(0) \quad (34)$$

To find the minimum, the derivative of Equation (34) is set equal to 0. Thus, the optimum value for the combining coefficient $\gamma$ that minimizes the combined output $\epsilon$ is given by Equation (35) as follows:

$$\gamma_{opt}=\frac{R_{11}(0)}{R_{22}(0)+R_{11}(0)} \quad (35)$$

If the two microphone signals are correlated, then the optimum combining coefficient $\gamma_{opt}$ is given by Equation (36) as follows:

$$\gamma_{opt}=\frac{R_{12}(0)+R_{11}(0)}{R_{11}(0)+R_{22}(0)+2R_{12}(0)} \quad (36)$$

To check these equations for consistency, consider the case where the two microphone signals are identical ($m_1(t)=m_2(t)$). Note that this discussion assumes that the omnidirectional microphone responses are flat over the desired frequency range of operation with no distortion, where the electrical microphone output signals are directly proportional to the scalar acoustic pressures applied at the microphone inputs. For this specific case, $$\gamma_{opt}=1/2 \quad (37)$$

which is a symmetric solution, although all values ($0\leq\gamma_{opt}\leq 1$) of $\gamma_{opt}$ yield the same result for the combined output signal. If the two microphone signals are uncorrelated and have the same power, then the same value of $\gamma_{opt}$ is obtained. If $m_1(t)=0$, $\forall t$ and $E[m_2^2]>0$, then $\gamma_{opt}=0$, which corresponds to a minimum energy for the combined output signal. Likewise, if $E[m_1(t)^2]>0$ and $m_2(t)=0$, $\forall t$, then $\gamma_{opt}=1$, which again corresponds to a minimum energy for the combined output signal.

A more-interesting case is one that covers a model of the case of a desired signal that has delay and attenuation between the microphones with independent (or less restrictively uncorrelated) additive noise. For this case, the microphone signals are given by Equation (38) as follows:

$$m_1(t)=x(t)+n_1(t)$$

$$m_2(t)=\alpha x(t-\tau)+n_2(t) \quad (38)$$

where $n_1(t)$ and $n_2(t)$ are uncorrelated noise signals at the first and second microphones, respectively, $\alpha$ is an amplitude scale factor corresponding to the attenuation of the acoustic pressure signal picked up by the microphones. The delay, $\tau$ is the time that it takes for the acoustic signal x(t) to travel between the two microphones, which is dependent on the microphone spacing and the angle that the acoustic signal is propagating relative to the microphone axis.

Thus, the correlation functions can be written according to Equation (39) as follows:

$$R_{11}(0)=R_{xx}(0)+R_{n_1n_1}(0)$$

$$R_{22}(0)=\alpha^2 R_{xx}(0)+R_{n_2n_2}(0)$$

$$R_{12}(0)=\alpha R_{xx}(-\tau)=\alpha R_{xx}(\tau) \quad (39)$$

where $R_{xx}(0)$ is the autocorrelation at zero time lag for the propagating acoustic signal, $R_{xx}(\tau)$ and $R_{xx}(-\tau)$ are the correlation values at time lags $+\tau$ and $-\tau$, respectively, and $R_{n_1n_1}(0)$ and $R_{n_2n_2}(0)$ are the auto-correlation functions at zero time lag for the two noise signals $n_1(t)$ and $n_2(t)$.

Substituting Equation (39) into Equation 36) yields Equation (40) as follows:

$$\gamma_{opt}=\frac{\alpha R_{xx}(\tau)+R_{xx}(0)+R_{n_1n_1}(0)}{(1+\alpha^2)R_{xx}(0)+R_{n_1n_1}(0)+R_{n_2n_2}(0)+2\alpha R_{xx}(\tau)} \quad (40)$$

If it is assumed that the spacing is small (e.g., $kd\ll\pi$, where $k=\omega/c$ is the wavenumber, and d is the spacing) and the signal m(t) is relatively low-passed, then the following approximation holds: $R_{xx}(\tau)\approx R_{11}(0)$. With this assumption, the optimal combining coefficient $\gamma_{opt}$ is given by Equation (41) as follows:

$$\gamma_{opt}\approx\frac{(1+\alpha)R_{xx}(0)+R_{n_1n_1}(0)}{(1+\alpha)^2 R_{xx}(0)+R_{n_1n_1}(0)+R_{n_2n_2}(0)} \quad (41)$$

Figure 9:
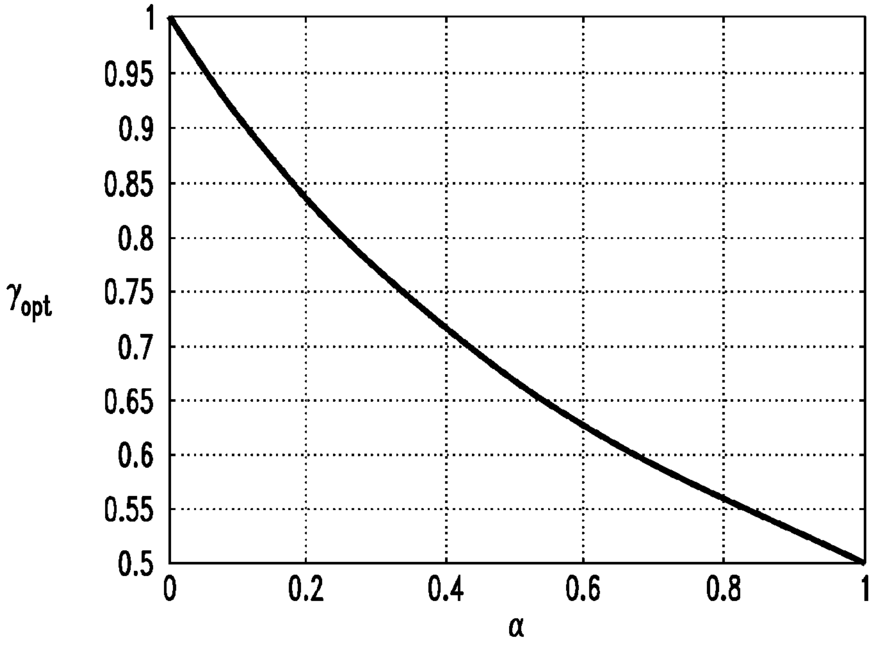
FIG. 9 shows a plot of Equation (41) for values of $0 \leq \alpha \leq 1$ for no noise.

One limitation to this solution is the case when the two microphones are placed in the nearfield, especially when the spacing from the source to the first microphone is smaller than the spacing between the microphones. For this case, the optimum combiner will select the microphone that has the lowest signal. This problem can be seen if we assume that the noise signals are zero and $\alpha=0.5$ (the rear microphone is attenuated by 6 dB). FIG. 9 shows a plot of Equation (41) for values of $0\leq\alpha\leq 1$ for no noise ($n_1(t)=n_2(t)=0$). As can be seen in FIG. 9, as the amplitude scale factor $\alpha$ goes from zero to unity, the optimum value of the combining coefficient $\gamma$ goes from unity to one-half.

Thus, for nearfield sources with no noise, the optimum combiner will move towards the microphone with the lower power. Although this is what is desired when there is asymmetric wind noise, it is desirable to select the higher-power microphone for the wind noise-free case. In order to handle this specific case, it is desirable to form a robust wind-noise detector that is immune to the nearfield effect. This topic is covered in a later section.

Microphone Array Wind-Noise Suppression

As shown in Elko-1, the sensitivity of differential microphones is proportional to $k^n$, where $|k|=k=\omega/c$ and n is the order of the differential microphone. For convective turbulence, the speed of the convected fluid perturbations is much less that the propagation speed for radiating acoustic signals. For wind noise, the difference between propagating speeds is typically by two orders of magnitude. As a result, for convective turbulence and propagating acoustic signals at the same frequency, the wave-number ratio will differ by two orders of magnitude. Since the sensitivity of differential microphones is proportional to $k^n$, the output signal ratio of turbulent signals will be two orders of magnitude greater than the output signal ratio of propagating acoustic signals for equivalent levels of pressure fluctuation.

A main goal of incoherent noise and turbulent wind-noise suppression is to determine what frequency components are due to noise and/or turbulence and what components are desired acoustic signals. The results of the previous sections can be combined to determine how to proceed.

U.S. Pat. No. 7,171,008 proposes a noise-signal detection and suppression algorithm based on the ratio of the difference-signal power to the sum-signal power. If this ratio is much smaller than the maximum predicted for acoustic signals (signals propagating along the axis of the microphones), then the signal is declared noise and/or turbulent, and the signal is used to update the noise estimation. The gain that is applied can be (i) the Wiener filter gain or (ii) by a general weighting (less than 1) that (a) can be uniform across frequency or (b) can be any desired function of frequency.

U.S. Pat. No. 7,171,008 proposed to apply a suppression weighting function on the output of a two-microphone array based on the enforcement of the difference-to-sum power ratio. Since wind noise results in a much larger ratio, suppressing by an amount that enforces the ratio to that of pure propagating acoustic signals traveling along the axis of the microphones results in an effective solution. Expressions for the fluctuating pressure signals $p_1(t)$ and $p_2(t)$ at both microphones for acoustic signals traveling along the microphone axis can be written according to Equation (42) as follows:

$$p_1(t)=s(t)+V(t)+n_1(t)$$

$$p_2(t)=s(t-\tau_s)+V(t-\tau_V)+n_2(t) \quad (42)$$

where $\tau_s$ is the delay for the propagating acoustic signal s(t), $\tau_V$ is the delay for the convective or slow propagating signal V(t), and $n_1(t)$ and $n_2(t)$ represent microphone self-noise and/or incoherent turbulent noise at the microphones. If we represent the signals in the frequency domain, then the power spectrum $Y_d(\omega)$ of the pressure difference $(p_1(t)-p_2(t))$ and the power spectrum $Y_s(\omega)$ of the pressure sum $(p_1(t)+p_2(t))$ can be written according to Equations (43) and (44) as follows:

$$Y_d(\omega)=4S_o^2(\omega)\sin^2\left(\frac{\omega d}{2c}\right)+4\aleph^2(\omega)\gamma_c^2(\omega)\sin^2\left(\frac{\omega d}{2U_c}\right)+2\aleph^2(\omega)[1-\gamma_c^2(\omega)]+N_1^2(\omega)+N_2^2(\omega) \quad (43)$$

and $$Y_s(\omega)=4S_o^2(\omega)\cos^2\left(\frac{\omega d}{2c}\right)+4\aleph^2(\omega)\gamma_c^2(\omega)+2\aleph^2(\omega)[1-\gamma_c^2(\omega)]+N_1^2(\omega)+N_2^2(\omega), \quad (44)$$

where $\gamma_c(\omega)$ is the turbulence coherence as measured or predicted by the Corcos (see G. M. Corcos, "The structure of the turbulent pressure field in boundary layer flows," J. Fluid Mech., 18: pp. 353-378, 1964, the teachings of which are incorporated herein by reference) or other turbulence models, $\aleph(\omega)$ is the RMS power of the turbulent noise, and $N_1$ and $N_2$, respectively, represent the RMS powers of the independent noise at the two microphones due to sensor self-noise.

The ratio of these factors gives the expected power ratio R(ω) of the difference and sum signals between the microphones according to Equation (45) as follows:

$$R(\omega)=\frac{Y_d(\omega)}{Y_s(\omega)}. \quad (45)$$

For turbulent flow where the convective wave speed is much less than the speed of sound, the power ratio R(ω) is much greater (by the ratio of the different propagation speeds). Also, since the convective-turbulence spatial-correlation function decays rapidly and this term becomes dominant when turbulence (or independent sensor self-noise is present), the resulting power ratio tends towards unity, which is even greater than the ratio difference due to the speed of propagation difference. As a reference, a purely propagating acoustic signal traveling along the microphone axis, the power ratio is given by Equation (46) as follows:

$$R_a(\omega)=\tan^2\left(\frac{\omega d}{2c}\right). \quad (46)$$

For general orientation of a single plane-wave where the angle between the planewave and the microphone axis is θ, the power ratio is given by Equation (47) as follows:

$$R_a(\omega,\theta)=\tan^2\left(\frac{\omega d\cos\theta}{2c}\right). \quad (47)$$

Figure 10:
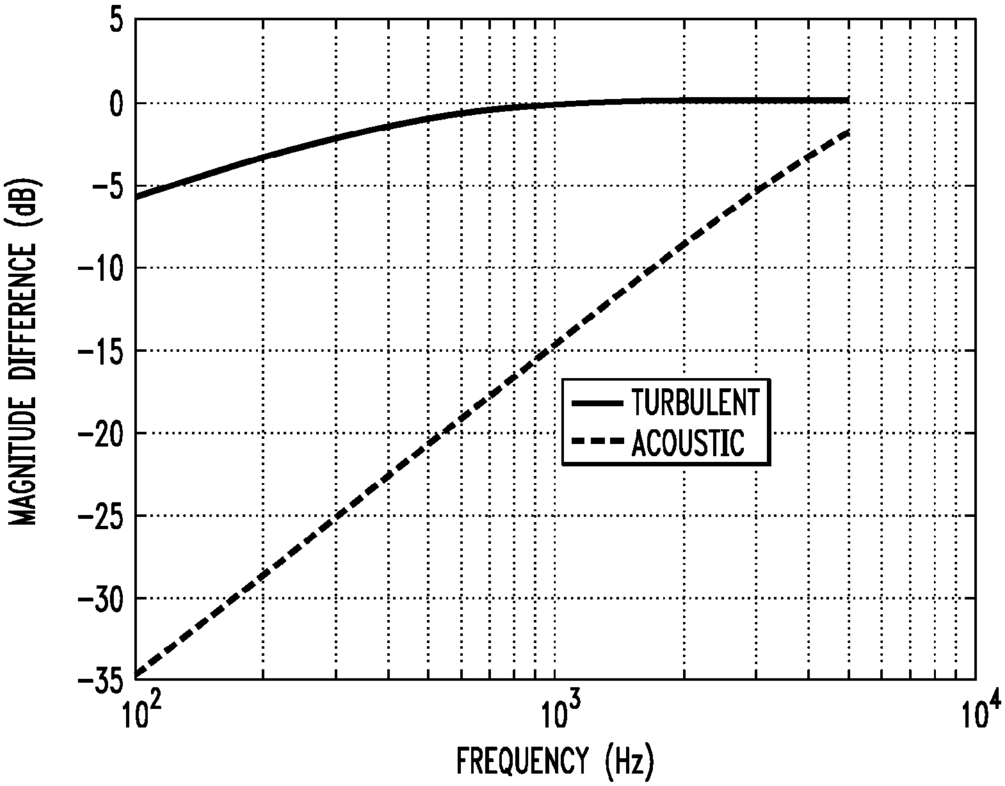
FIG. 10 shows acoustic and turbulent difference-to-sum power ratios for a pair of omnidirectional microphones spaced at 2 cm in a convective fluid flow propagating at 5 m/s.

The results shown in Equations (46) and (47) led to a relatively simple algorithm for suppression of airflow turbulence and sensor self-noise. The rapid decay of spatial coherence results in the relative powers between the differences and sums of the closely spaced pressure (zero-order) microphones being much larger than for an acoustic planewave propagating along the microphone array axis. As a result, it is possible to detect whether the acoustic signals transduced by the microphones are turbulent-like noise or propagating acoustic signals by comparing the sum and difference powers. FIG. 10 shows the difference-to-sum power ratio for a pair of omnidirectional microphones spaced at 2 cm in a convective fluid flow propagating at 5 m/s. It is clearly seen in this figure that there is a relatively wide difference between the acoustic and turbulent sum-difference power ratios. The ratio differences become more pronounced at low frequencies since the differential microphone rolls off at −6 dB/octave, where the predicted turbulent component rolls off at a much slower rate.

If sound arrives from off-axis from the microphone array, then the ratio of the difference-to-sum power levels for acoustic signals becomes even smaller as shown in Equation (47). Note that it has been assumed that the coherence decay is similar in all directions (isotropic). The power ratio R maximizes for acoustic signals propagating along the microphone axis. This limiting case is the key to the proposed wind-noise detection and suppression algorithm described in U.S. Pat. No. 7,171,008. The proposed suppression gain G(ω) is stated as follows: If the measured ratio exceeds that given by Equation (46), then the output signal power is reduced by the difference between the measured power ratio and that predicted by Equation (46). This gain G(ω) is given by Equation (48) as follows:

$$G(\omega)=\frac{R_a(\omega)}{R_m(\omega)} \quad (48)$$

where $R_m(\omega)$ is the measured difference-to-sum signal power ratio. A potentially desirable variation on the proposed suppression scheme described in Equation (48) allows the suppression to be tailored in a more general and flexible way by specifying the applied suppression as a function of the measured ratio R and the adaptive beamformer parameter β as a function of frequency.

Figure 11:
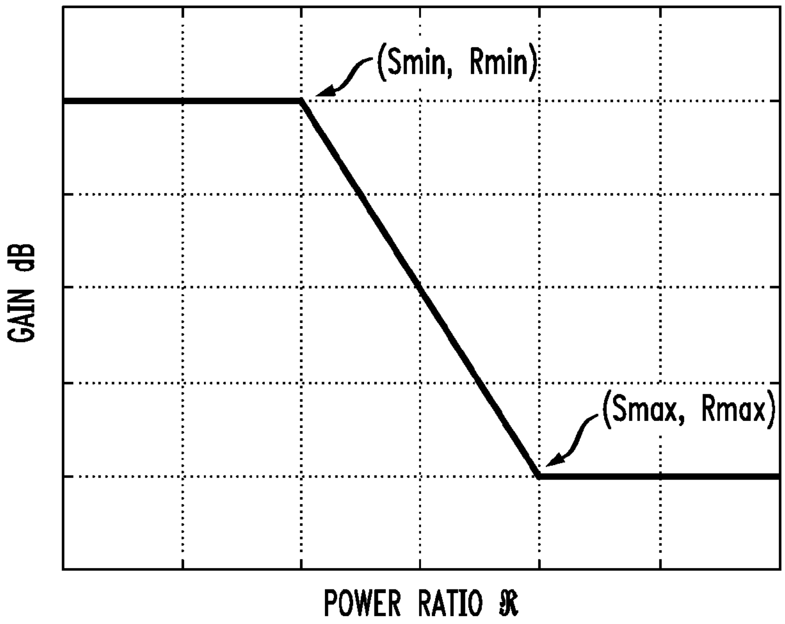
FIG. 11 shows a three-segment, piecewise-linear suppression function.

One proposed suppression scheme is described in PCT patent application serial no. PCT/US06/44427. The general idea proposed in that application is to form a piecewise-linear suppression function for each subband in a frequency-domain implementation. Since there is the possibility of having a different suppression function for each subband, the suppression function can be more generally represented as a suppression matrix. FIG. 11 shows a three-segment, piecewise-linear suppression function that has been used in some implementations with good results. More segments can offer finer detail in control. Typically, the suppression values of $S_{min}$ and $S_{max}$ and the power ratio values $R_{min}$ and $R_{max}$ are different for each subband in a frequency-domain implementation.

Combining the suppression defined in Equation (48) with the results given on the first-order adaptive beamformer leads to a new approach to deal with wind and self-noise. A desired property of this combined system is that one can maintain directionality when wind-noise sources are smaller than acoustic signals picked up by the microphones. Another advantage of the proposed solution is that the operation of the noise suppression can be accomplished in a gradual and continuous fashion. This novel hybrid approach is expressed in Table I. In this implementation, the values of β are constrained by the value of R(ω) as determined from the electronic windscreen algorithm described in U.S. Pat. No. 7,171,008 and PCT patent application no. PCT/US06/44427. In Table I, the directivity determined solely by the value of R(ω) is set to a fixed value. Thus, when there is no wind present, the value of β is selected by the designer to have a fixed value. As wind gradually becomes stronger, there is a monotonic mapping of the increase in R(ω) to β(ω) such that β(ω) gradually moves towards a value of −1 as the wind increases. One could also just switch the value of β to −1 when any wind is detected by the electronic windscreen or robust wind noise detectors described within this specification.

TABLE I

Beamforming Array Operation in Conjunction with Wind-Noise Suppression by Electronic Windscreen Algorithm

| Acoustic Condition | Electronic Windscreen Operation | Directional Pattern | β |
|---|---|---|---|
| No wind | No suppression | General Cardioid | 0 < β < 1 (β fixed) |
| Slight wind | Increasing suppression | Subcardioid | −1 < β < 0 (β is adaptive and trends to −1 as wind increases) |
| High wind | Maximum suppression | Omnidirectional | −1 |

Similarly, one can use the constrained or unconstrained value of β(ω) to determine if there is wind noise or uncorrelated noise in the microphone channels. Table II shows appropriate settings for the directional pattern and electronic windscreen operation as a function of the constrained or unconstrained value of β(ω) from the adaptive beamformer. In Table II, the suppression function is determined solely from the value of the constrained (or even possibly unconstrained) β, where the constrained β is such that −1<β<1. For 0<β<1, the value of β utilized by the beamformer can be either a fixed value that the designer would choose, or allowed to be adaptive. As the value of β becomes negative, the suppression would gradually be increased until it reached the defined maximum suppression when β≈−1. Of course, one could use both the values of R(ω) and β(ω) together to form a more-robust detection of wind and then to apply the appropriate suppression depending on how strong the wind condition is. The general scheme is that, as wind noise becomes larger and larger, the amount of suppression increases, and the value of β moves towards −1.

TABLE II

Wind-Noise Suppression by Electronic Windscreen Algorithm Determined by the Adaptive Beamformer Value of β

| Acoustic Conditions | β | Directional Pattern | Electronic Windscreen Operation |
|---|---|---|---|
| No wind | 0 < β < 1 (β fixed or adaptive) | General cardioid | No suppression |
| Slight wind | −1 < β < 0 | Subcardioid | Increasing suppression |
| High wind | −1 | Omnidirectional | Maximum suppression |

Front-End Calibration, Nearfield Operation, and Robust Wind-Noise Detection

In differential microphones arrays, the magnitudes and phase responses of the microphones used to realize the arrays should match closely. The degree to which the microphones should match increases as the ratio of the microphone element spacing becomes much less than the acoustic wavelength. Thus, the mismatch in microphone gains that is inherent in inexpensive electret and condenser microphones on the market today should be controlled. This potential issue can be dealt with by calibrating the microphones during manufacture or allowing for an automatic in-situ calibration. Various methods for calibration exist and some techniques that handle automatic in-situ amplitude and phase mismatch are covered in U.S. Pat. No. 7,171,008.

Figure 12:
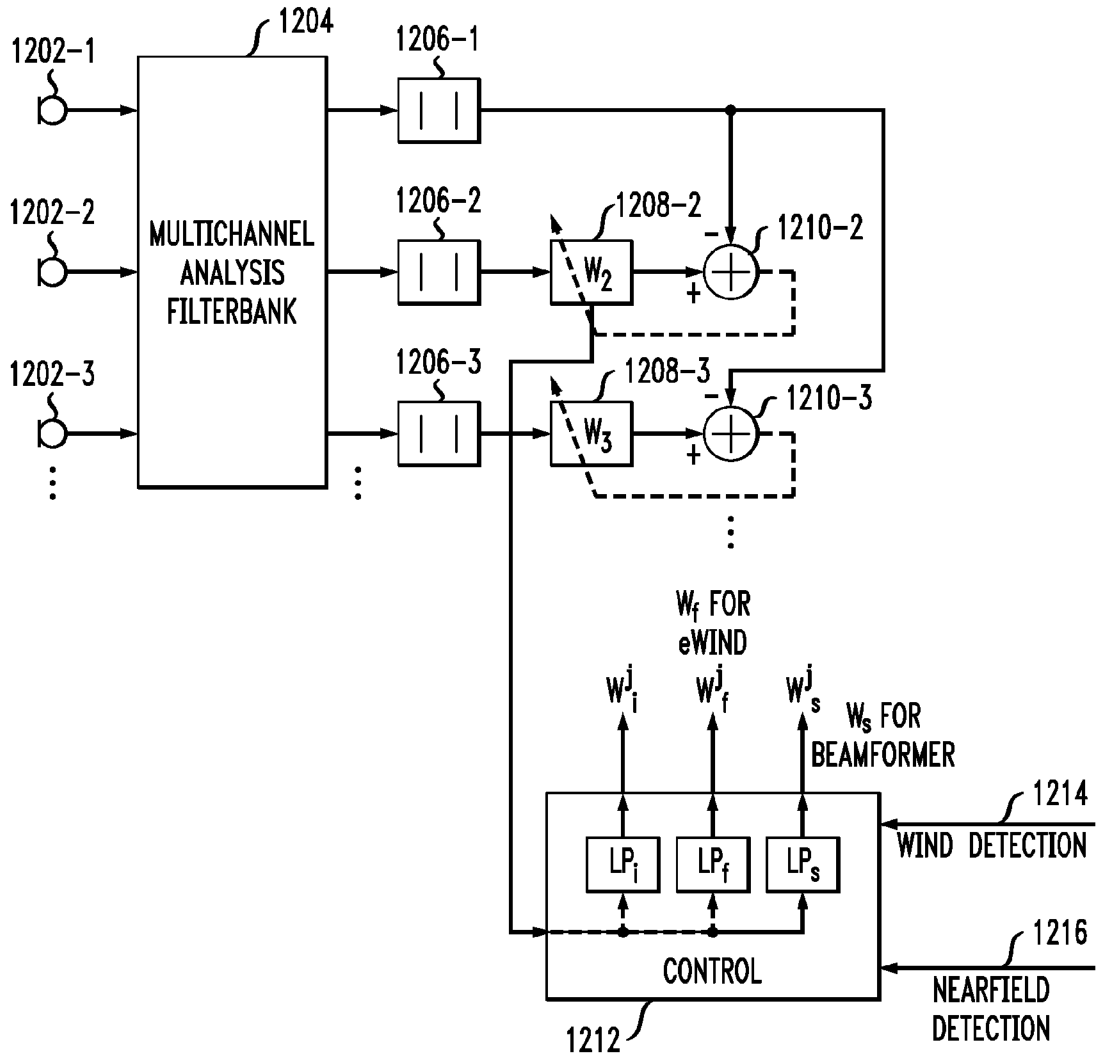
FIG. 12 shows a block diagram of a microphone amplitude calibration system for a set of microphones.

One scheme that has been shown to be effective in implementation is to use an adaptive filter to match bandpass-filtered microphone envelopes. FIG. 12 shows a block diagram of a microphone amplitude calibration system 1200 for a set of microphones 1202. First, one microphone (microphone 1202-1 in the implementation of FIG. 12) is designated as the reference from which all other microphones are calibrated. Subband filterbank 1204 breaks each microphone signal into a set of subbands. The subband filterbank can be either the same as that used for the noise-suppression algorithm or some other filterbank. For speech, one can choose a band that covers the frequency range from 500 Hz to about 1 kHz. Other bands can be chosen depending on how wide the frequency averaging is desired. Multiple bands can be measured and applied to cover the case where the transducers are not flat and deviate in their relative response as a function of frequency. However, with typical condenser and electret microphones, the response is usually flat over the desired frequency band of operation. Even if the microphones are not flat in response, the microphones have similar responses if they have atmospheric pressure equalization with low-frequency rolloffs and upper resonance frequencies and Q-factors that are close to one another.

For each different subband of each different microphone signal, an envelope detector 1206 generates a measure of the subband envelope. For each non-reference microphone (each of microphones 1202-2, 1202-3, . . . in the implementation of FIG. 12), a single-tap adaptive filter 1208 scales the average subband envelope corresponding to one or more adjacent subbands based on a filter coefficient $w_j$ that is adaptively updated to reduce the magnitude of an error signal generated at a difference node 1210 and corresponding to the difference between the resulting filtered average subband envelope and the corresponding average reference subband envelope from envelope detector 1206-1. The resulting filter coefficient $w_j$ represents an estimate of the relative magnitude difference between the corresponding subbands of the particular non-reference microphone and the corresponding subbands of the reference microphone. One could use the microphone signals themselves rather than the subband envelopes to characterize the relative magnitude differences between the microphones, but some undesired bias can occur if one uses the actual microphone signals. However, the bias can be kept quite small if one uses a low-frequency band of a filterbank or a bandpassed signal with a low center frequency.

The time-varying filter coefficients $w_j$ for each microphone and each set of one or more adjacent subbands are applied to control block 1212, which applies those filter coefficients to three different low-pass filters that generate three different filtered weight values: an "instantaneous" low-pass filter $LP_i$ having a high cutoff frequency (e.g., about 200 Hz) and generating an "instantaneous" filtered weight value $w_i^j$, a "fast" low-pass filter $LP_f$ having an intermediate cutoff frequency (e.g., about 20 Hz) and generating a "fast" filtered weight value $w_f^j$, and a "slow" low-pass filter $LP_s$ having a low cutoff frequency (e.g., about 2 Hz) and generating a "slow" filtered weight value $w_s^j$. The instantaneous weight values $w_i^j$ are preferably used in a wind-detection scheme, the fast weight values $w_f^j$ are preferably used in an electronic wind-noise suppression scheme, and the slow weight values $w_s^j$ are preferably used in the adaptive beamformer. The exemplary cutoff frequencies for these lowpass filters are just suggestions and should not be considered optimal values. FIG. 12 illustrates the low-pass filtering applied by control block 1212 to the filter coefficients $w_2$ for the second microphone. Control block 1212 applies analogous filtering to the filter coefficients corresponding to the other non-reference microphones.

As shown in FIG. 12, control block 1212 also receives wind-detection signals 1214 and nearfield-detection signals 1216. Each wind-detection signal 1214 indicates whether the microphone system has detected the presence of wind in one or more microphone subbands, while each nearfield-detection signal 1216 indicates whether the microphone system has detected the presence of a nearfield acoustic source in one or more microphone subbands. In one possible implementation of control block 1212, if, for a particular microphone and for a particular subband, either the corresponding wind-detection signal 1214 indicates presence of wind or the corresponding nearfield-detection signal 1216 indicates presence of a nearfield source, then the updating of the filtered weight values for the corresponding microphone and the corresponding subband is suspended for the long-term beamformer weights, thereby maintaining those weight factors at their most-recent values until both wind and a nearfield source are no longer detected and the updating of the weight factors by the low-pass filters is resumed. A net effect of this calibration-inhibition scheme is to allow beamformer weight calibration only when farfield signals are present without wind.

The generation of wind-detection signal 1214 by a robust wind-detection scheme based on computed wind metrics in different subbands is described in further detail below with respect to FIGS. 13 and 14. Regarding generation of nearfield-detection signal 1216, nearfield source detection is based on a comparison of the output levels from the underlying back-to-back cardioid signals that are the basis signals used in the adaptive beamformer. For a headset application, where the array is pointed in the direction of the headset wearer's mouth, a nearfield source is detected by comparing the power differences between forward-facing and rearward-facing synthesized cardioid microphone patterns. Note that these cardioid microphone patterns can be realized as general forward and rearward beampatterns not necessarily having a null along the microphone axis. These beampatterns can be variable so as to minimize the headset wearer's nearfield speech in the rearward-facing synthesized beamformer. Thus, the rearward-facing beamformer may have a nearfield null, but not a null in the farfield. If the forward cardioid signal (facing the mouth) greatly exceeds the rearward cardioid signal, then a nearfield source is declared. The power differences between the forward and rearward cardioid signals can also be used to adjust the adaptive beamformer speed. Since active speech by a headset wearer can cause the adaptive beamformer to adjust to the wearer's speech, one can inhibit this undesired operation by either turning off or significantly slowing the adaptive beamformer speed of operation. In one possible implementation, the speed of operation of the adaptive beamformer can be decreased by reducing the magnitude of the update step-size μ in Equation (17).

In the last section, it was shown that, for farfield sources, the difference-to-sum power ratio is an elegant and computationally simple detector for wind and uncorrelated noise between corresponding subbands of two microphones. For nearfield operation, this simple wind-noise detector can falsely trigger even when wind is not present due to the large level differences that the microphones can have in the nearfield of the desired source. Therefore, a wind-noise detector should be robust with nearfield sources. FIGS. 13 and 14 show block diagrams of wind-noise detectors that can effectively handle operation of the microphone array in the nearfield of a desired source. FIGS. 13 and 14 represent wind-noise detection for three adjacent subbands of two microphones: reference microphone 1202-1 and non-reference microphone 1202-2 of FIG. 12. Analogous processing can be applied for other subbands and/or additional non-reference microphones.

Figure 13:
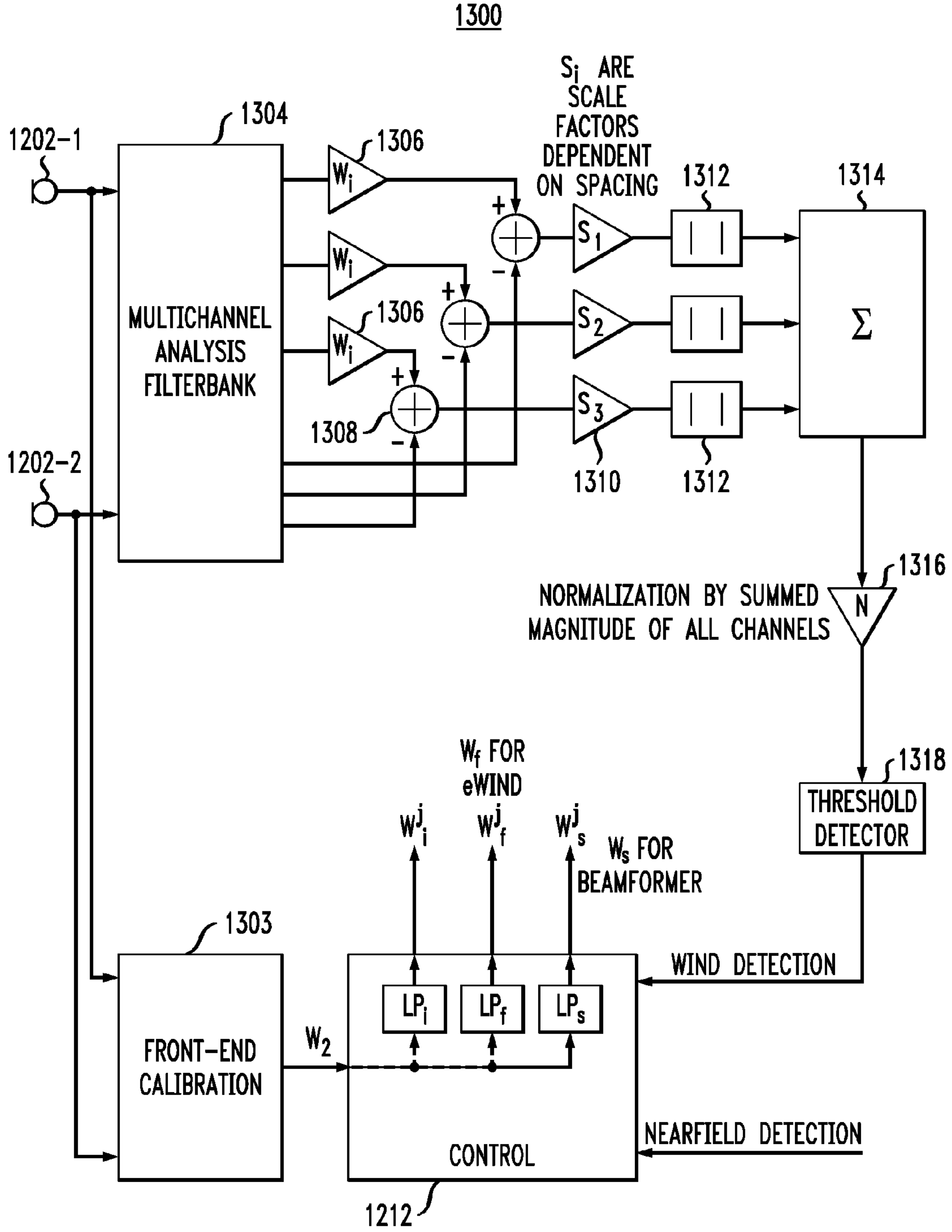
FIG. 13 shows a block diagram of a wind-noise detector.

As shown in FIG. 13, wind-noise detector 1300 comprises control block 1212 of FIG. 12, which generates instantaneous, fast, and slow weight factors $w_i^{j=2}$, $w_f^{j=2}$, and $w_s^{j=2}$ based on filter coefficients $w_2$ generated by front-end calibration 1303. Front-end calibration 1303 represents the processing of FIG. 12 associated with the generation of filter coefficients $w_2$. Depending on the particular implementation, subband filterbank 1304 of FIG. 13 may be the same as or different from subband filterbank 1204 of FIG. 12.

For each of the three illustrated subbands of filterbank 1304, a corresponding difference node 1308 generates the difference between the subband coefficients for reference microphone 1202-1 and weighted subband coefficients for non-reference microphone 1202-2, where the weighted subband coefficients are generated by applying the corresponding instantaneous weight factor $w_i^{j=2}$ from control block 1212 to the "raw" subband coefficients for non-reference microphone 1202-2 at a corresponding amplifier 1306. Note that, if the weight factor $w_i^{j=2}$ is less than 1, then amplifier 1306 will attenuate rather than amplify the raw subband coefficients.

The resulting difference values are scaled at scalar amplifiers 1310 based on scale factors $s_k$ that depend on the spacing between the two microphones (e.g., the greater the microphone spacing and greater the frequency of the subband, the greater the scale factor). The magnitudes of the resulting scaled, subband-coefficient differences are generated at magnitude detectors 1312. Each magnitude constitutes a measure of the difference-signal power for the corresponding subband. The three difference-signal power measures are summed at summation block 1314, and the resulting sum is normalized at normalization amplifier 1316 based on the summed magnitude of all three subbands for both microphones 1202-1 and 1202-2. This normalization factor constitutes a measure of the sum-signal power for all three subbands. As such, the resulting normalized value constitutes a measure of the effective difference-to-sum power ratio R (described previously) for the three subbands.

This difference-to-sum power ratio R is thresholded at threshold detector 1318 relative to a specified corresponding ratio threshold level. If the difference-to-sum power ratio R exceeds the ratio threshold level, then wind is detected for those three subbands, and control block 1212 suspends updating of the corresponding weight factors by the low-pass filters for those three subbands.

Figure 14:
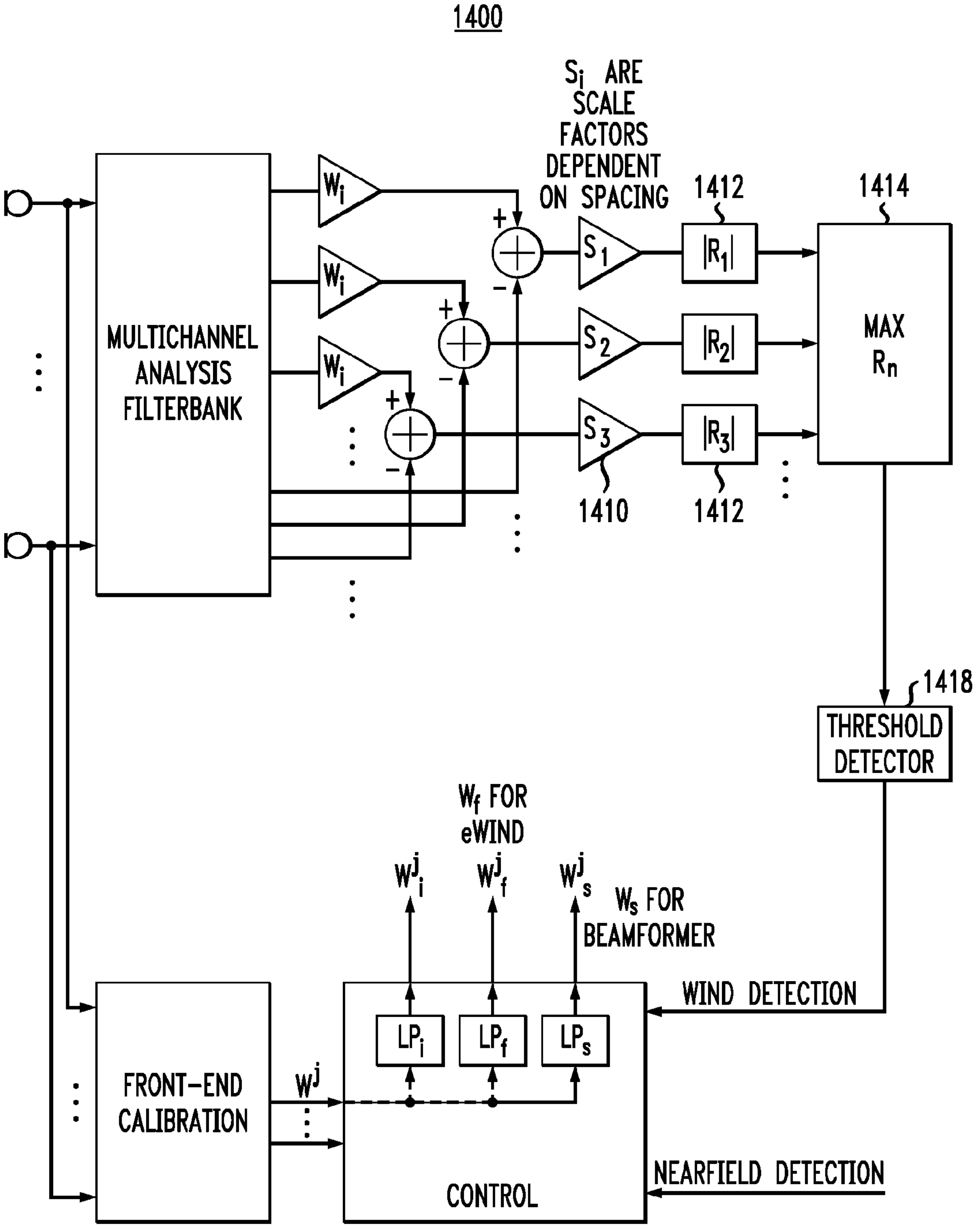
FIG. 14 shows a block diagram of an alternative wind-noise detector.

FIG. 14 shows an alternative wind-noise detector 1400, in which a difference-to-sum power ratio R k is estimated for each of the three different subbands at ratio generators 1412, and the maximum power ratio (selected at max block 1414) is applied to threshold detector 1418 to determine whether wind-noise is present for all three subbands.

In FIGS. 13 and 14, the scalar amplifiers 1310 and 1410 can be used to adjust the frequency equalization between the difference and sum powers.

The algorithms described herein for the detection of wind noise also function effectively as algorithms for the detection of microphone thermal noise and circuit noise (where circuit noise includes quantization noise in sampled data implementations). As such, as used in this specification including the attached claims, the detection of the presence of wind noise should be interpreted as referring to the detection of the presence of any of wind noise, microphone thermal noise, and circuit noise.

Implementation

Figure 15:
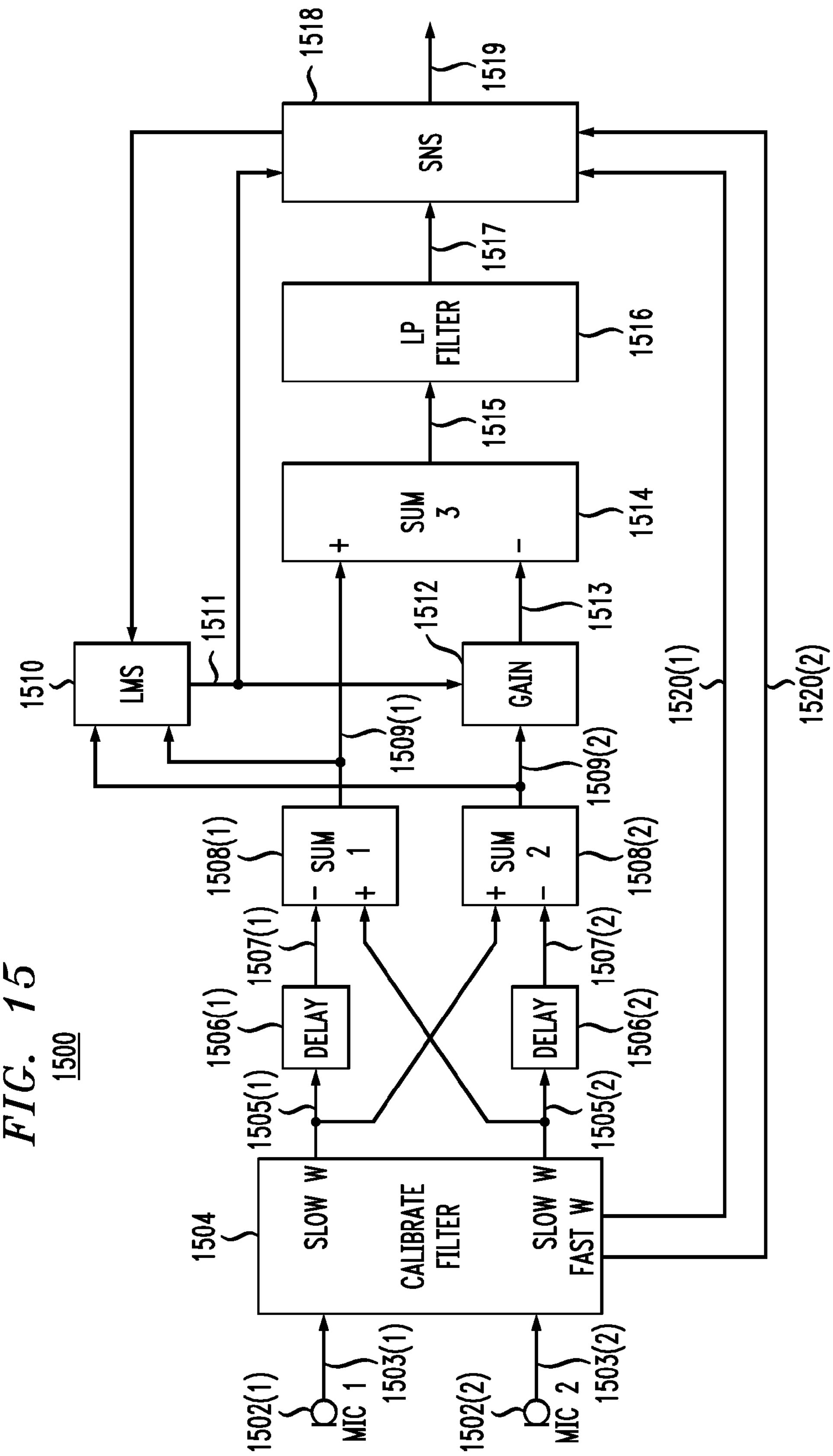
FIG. 15 shows a block diagram of an audio system, according to one embodiment of the present invention

FIG. 15 shows a block diagram of an audio system 1500, according to one embodiment of the present invention. Audio system 1500 is a two-element microphone array that combines adaptive beamforming with wind-noise suppression to reduce wind noise induced into the microphone output signals. In particular, audio system 1500 comprises (i) two (e.g., omnidirectional) microphones 1502(1) and 1502(2) that generate electrical audio signals 1503(1) and 1503(2), respectively, in response to incident acoustic signals and (ii) signal-processing elements 1504-1518 that process the electrical audio signals to generate an audio output signal 1519, where elements 1504-1514 form an adaptive beamformer, and spatial-noise suppression (SNS) processor 1518 performs wind-noise suppression as defined in U.S. Pat. No. 7,171,008 and in PCT patent application PCT/US06/44427.

Calibration filter 1504 calibrates both electrical audio signals 1503 relative to one another. This calibration can either be amplitude calibration, phase calibration, or both. U.S. Pat. No. 7,171,008 describes some schemes to implement this calibration in situ. In one embodiment, a first set of weight factors are applied to microphone signals 1503(1) and 1503(2) to generate first calibrated signals 1505(1) and 1505(2) for use in the adaptive beamformer, while a second set of weight factors are applied to the microphone signals to generate second calibrated signals 1520(1) and 1520(2) for use in SNS processor 1518. As describe earlier with respect to FIG. 12, the first set of weight factors are the weight factors $w_s^j$ generated by control block 1212, while the second set of weight factors are the weight factors $w_f^j$ generated by control block 1212.

Copies of the first calibrated signals 1505(1) and 1505(2) are delayed by delay blocks 1506(1) and 1506(2). In addition, first calibrated signal 1505(1) is applied to the positive input of difference node 1508(2), while first calibrated signal 1505(2) is applied to the positive input of difference node 1508(1). The delayed signals 1507(1) and 1507(2) from delay nodes 1506(1) and 1506(2) are applied to the negative inputs of difference nodes 1508(1) and 1508(2), respectively. Each difference node 1508 generates a difference signal 1509 corresponding to the difference between the two applied signals.

Difference signals 1509 are front and back cardioid signals that are used by LMS (least mean square) block 1510 to adaptively generate control signal 1511, which corresponds to a value of adaptation factor $\beta$ that minimizes the power of output signal 1519. LMS block 1510 limits the value of $\beta$ to a region of $-1 \leq \beta \leq 0$. One modification of this procedure would be to set $\beta$ to a fixed, non-zero value, when the computed value for $\beta$ is greater that 0. By allowing for this case, $\beta$ would be discontinuous and would therefore require some smoothing to remove any switching transient in the output audio signal. One could allow $\beta$ to operate adaptively in the range $-1 \leq \beta \leq 1$, where operation for $0 \leq \beta \leq 1$ is described in U.S. Pat. No. 5,473,701.

Difference signal 1509(1) is applied to the positive input of difference node 1514, while difference signal 1509(2) is applied to gain element 1512, whose output 1513 is applied to the negative input of difference node 1514. Gain element 1512 multiplies the rear cardioid generated by difference node 1508(2) by a scalar value computed in the LMS block to generate the adaptive beamformer output. Difference node 1514 generates a difference signal 1515 corresponding to the difference between the two applied signals 1509(1) and 1513.

After the adaptive beamformer of elements 1504-1514, first-order low-pass filter 1516 applies a low-pass filter to difference signal 1515 to compensate for the C high-pass that is imparted by the cardioid beamformers. The resulting filtered signal 1517 is applied to spatial-noise suppression processor 1518. SNS processor 1518 implements a generalized version of the electronic windscreen algorithm described in U.S. Pat. No. 7,171,008 and PCT patent application PCT/US06/44427 as a subband-based processing function. Allowing the suppression to be defined generally as a piecewise linear function in the log-log domain, rather than by the ratio G(ω) given in Equation (48), allows more-precise tailoring of the desired operation of the suppression as a function of the log of the measured power ratio $R_m$. Processing within SNS block 1518 is dependent on second calibrated signals 1520 from both microphones as well as the filtered output signal 1517 from the adaptive beamformer. SNS block 1518 can also use the $\beta$ control signal 1511 generated by LMS block 1510 to further refine and control the wind-noise detector and the overall suppression to the signal achieved by the SNS block. Although not shown in FIG. 15, SNS 1518 implements equalization filtering on second calibrated signals 1520.

Figure 16:
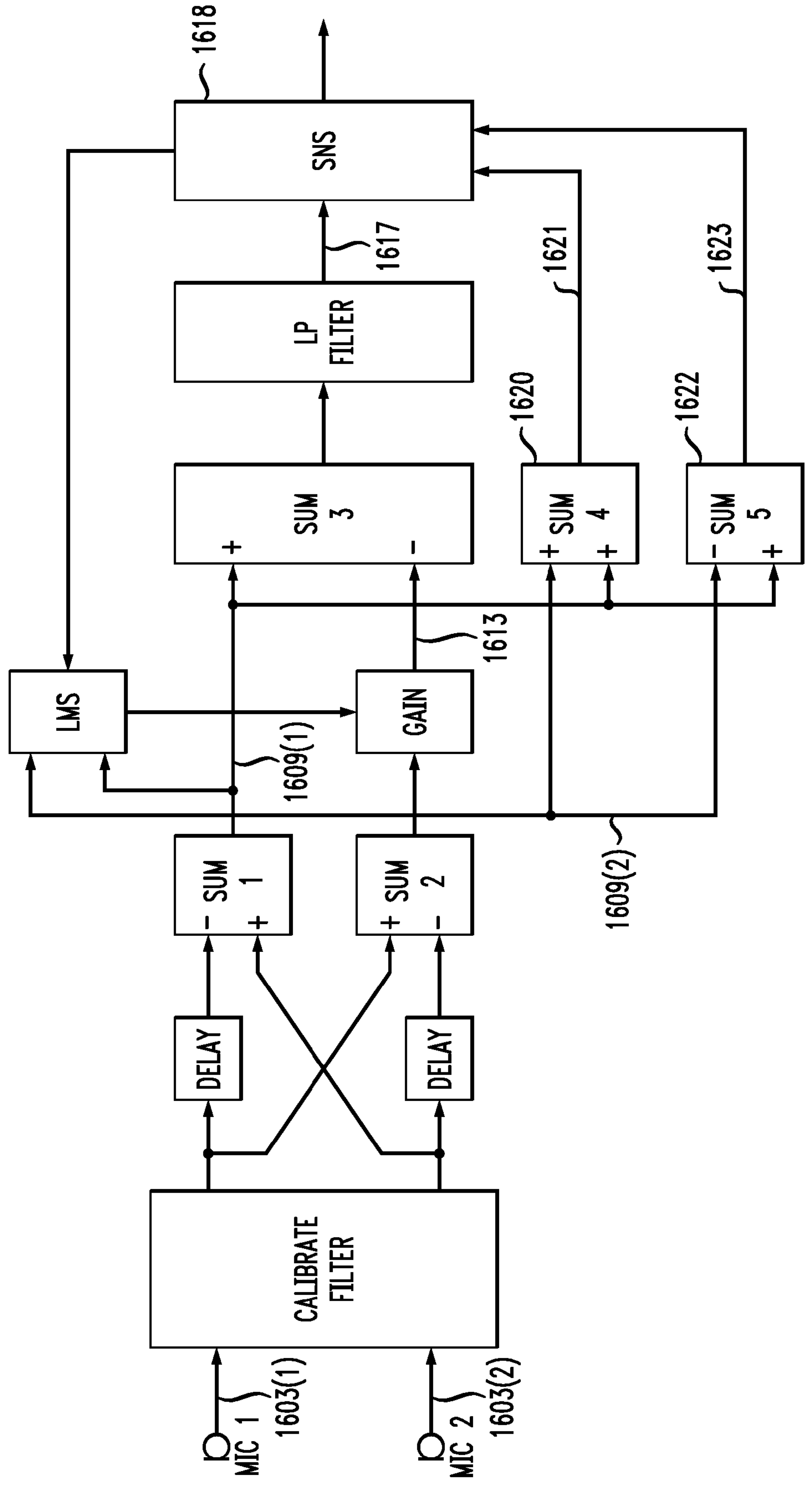
FIG. 16 shows a block diagram of an audio system, according to another embodiment of the present invention.

FIG. 16 shows a block diagram of an audio system 1600, according to another embodiment of the present invention. Audio system 1600 is similar to audio system 1500 of FIG. 15, except that, instead of receiving the calibrated microphone signals, SNS block 1618 receives sum signal 1621 and difference signal 1623 generated by sum and different nodes 1620 and 1622, respectively. Sum node 1620 adds the two cardioid signals 1609(1) and 1609(2) to generate sum signal 1621, corresponding to an omnidirectional response, while difference node 1622 subtracts the two cardioid signals to generate difference signal 1623, corresponding to a dipole response. The low-pass filtered sum 1617 of the two cardioid signals 1609(1) and 1613 is equal to a filtered addition of the two microphone input signals 1603(1) and 1603(2). Similarly, the low-pass filtered difference 1623 of the two cardioid signals is equal to a filtered subtraction of the two microphone input signals.

One difference between audio system 1500 of FIG. 15 and audio system 1600 of FIG. 16 is that SNS block 1518 of FIG. 15 receives the second calibrated microphone signals 1520(1) and 1520(2), while audio system 1600 derives sum and difference signals 1621 and 1623 from the computed cardioid signals 1609(1) and 1609(2). While the derivation in audio system 1600 might not be useful with nearfield sources, one advantage to audio system 1600 is that, since sum and difference signals 1621 and 1623 have the same frequency response, they do not need to be equalized.

Figure 17:
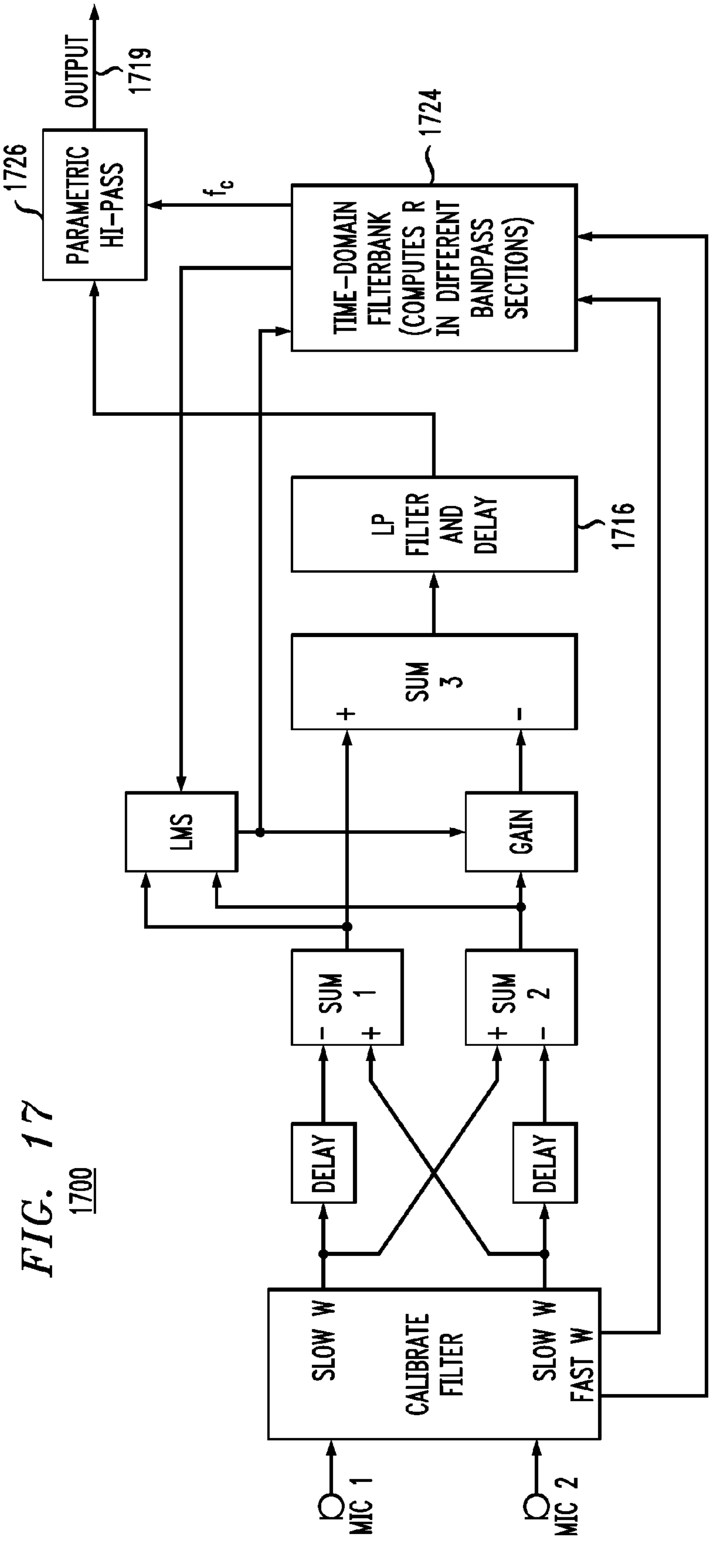
FIG. 17 shows a block diagram of an audio system, according to yet another embodiment of the present invention.

FIG. 17 shows a block diagram of an audio system 1700, according to yet another embodiment of the present invention. Audio system 1700 is similar to audio system 1500 of FIG. 15, where SNS block 1518 of FIG. 15 is implemented using time-domain filterbank 1724 and parametric high-pass filter 1726. Since the spectrum of wind noise is dominated by low frequencies, audio system 1700 implements filterbank 1724 as a set of time-domain band-pass filters to compute the power ratio R as a function of frequency. Having R computed in this fashion allows for dynamic control of parametric high-pass filter 1726 in generating output signal 1719. In particular, filterbank 1724 generates cutoff frequency $f_c$, which high-pass filter 1726 uses as a threshold to effectively suppress the low-frequency wind-noise components. The algorithm to compute the desired cutoff frequency uses the power ratio R as well as the adaptive beamformer parameter β. When β is less than 1 but greater than 0, the cutoff frequency is set at a low value. However, as β goes negative towards the limit at −1, this indicates that there is a possibility of wind noise. Therefore, in conjunction with the power ratio R, a high-pass filter is progressively applied when both β goes negative and R exceeds some defined threshold. This implementation can be less computationally demanding than a full frequency-domain algorithm, while allowing for significantly less time delay from input to output. Note that, in addition to applying low-pass filtering, block LI applies a delay to compensate for the processing time of filterbank 1724.

Figure 18:
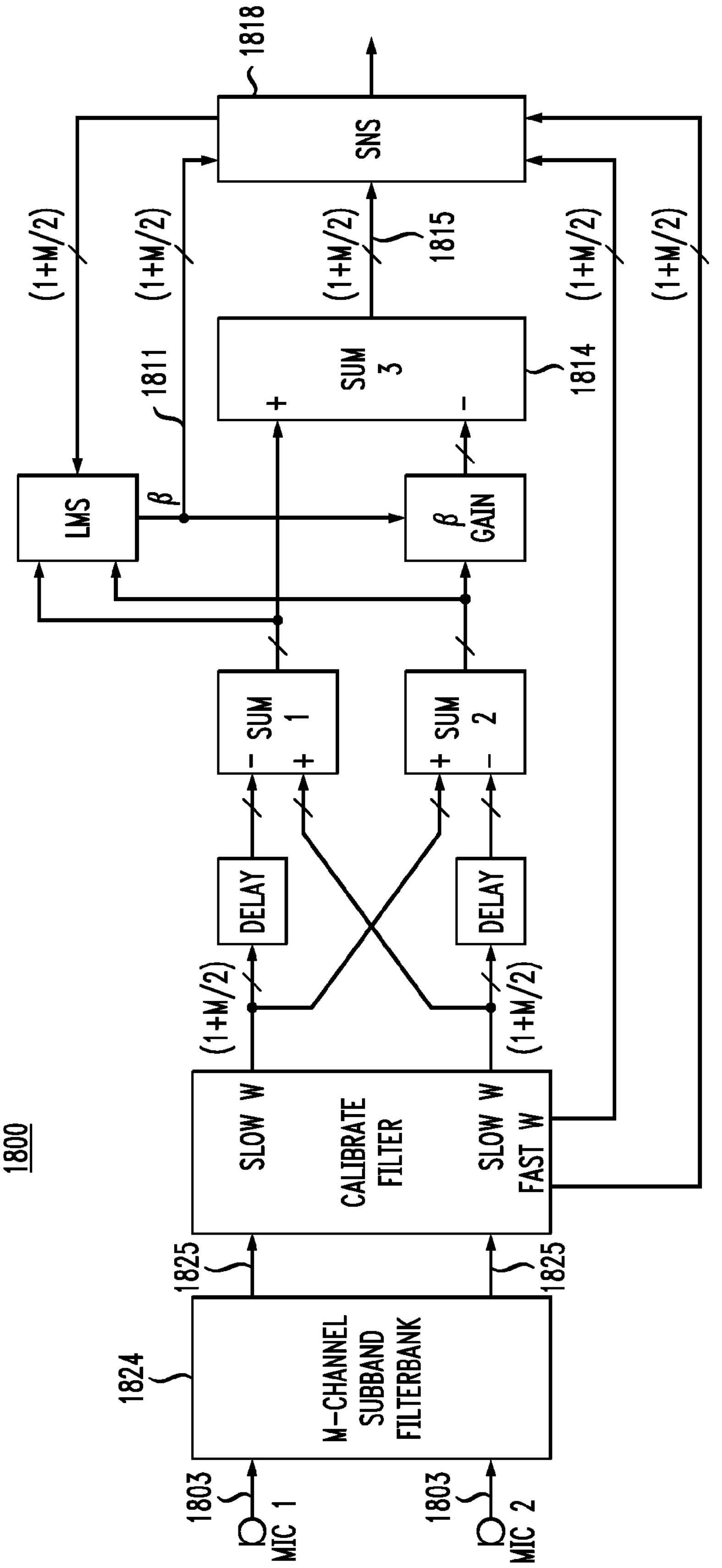
FIG. 18 shows a block diagram of an audio system 1800, according to still another embodiment of the present invention.

FIG. 18 shows a block diagram of an audio system 1800, according to still another embodiment of the present invention. Audio system 1800 is analogous to audio system 1700 of FIG. 17, where both the adaptive beamforming and the spatial-noise suppression are implemented in the frequency domain. To achieve this frequency-domain processing, audio system 1800 has M-tap FFT-based subband filterbank 1824, which converts each time-domain audio signal 1803 into (1+M/2) frequency-domain signals 1825. Moving the subband filter decomposition to the output of the microphone calibration results in multiple, simultaneous, adaptive, first-order beamformers, where SNS block 1818 implements processing analogous to that of SNS 1518 of FIG. 15 for each different beamformer output 1815 based on a corresponding frequency-dependent adaptation parameter β represented by frequency-dependent control signal 1811. Note that, in this frequency-domain implementation, there is no low-pass filter implemented between difference node 1814 and SNS block 1818.

One advantage of this implementation over the time-domain adaptive beamformers of FIGS. 15-17 is that multiple noise sources arriving from different directions at different frequencies can now be simultaneously minimized. Also, since wind noise and electronic noise have a 1/f or even $1/f^2$ dependence, a subband implementation allows the microphone to tend towards omnidirectional at the dominant low frequencies when wind is present, and remain directional at higher frequencies where the interfering noise source might be dominated by acoustic noise signals. As with the modification shown in FIG. 16, processing of the sum and difference signals can alternatively be accomplished in the frequency domain by directly using the two back-to-back cardioid signals.

Higher-Order Differential Microphone Arrays

The previous descriptions have been limited to first-order differential arrays. However, the processing schemes to reduce wind and circuit noise for first-order arrays are similarly applicable to higher-order differential arrays, which schemes are developed here.

Figure 19:
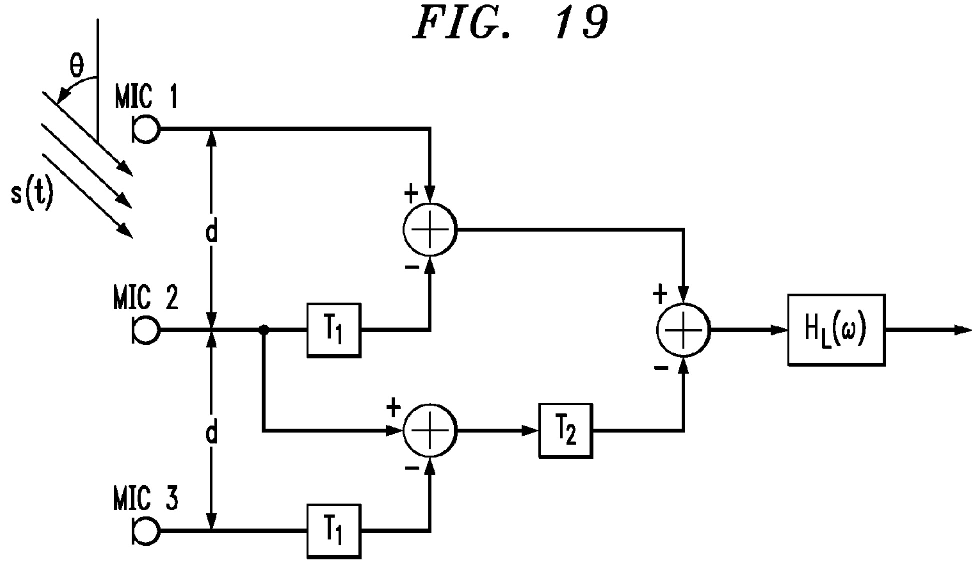
FIG. 19 shows a block diagram of a three-element array.

For a plane-wave signal s(t) with spectrum S(ω) and wavevector k incident on a three-element array with displacement vector d shown in FIG. 19, the output can be written as:

$$\begin{aligned} Y_2(\omega,\theta) &= S(\omega)(1-e^{-j(\omega T_1+k\cdot d)})(1-e^{-j(\omega T_2+k\cdot d)}) \\ &= S(\omega)(1-e^{-j\omega(T_1+(d\cos\theta)/c)})(1-e^{-j\omega(T_2+(d\cos\theta)/c)}) \end{aligned} \quad (49)$$

where d=|d| is the element spacing for the first-order and second-order sections. The delay $T_1$ is equal to the delay applied to one sensor of the first-order sections, and $T_2$ is the delay applied to the combination of the two first-order sections. The subscript on the variable Y is used to designate that the system response is a second-order differential response. The magnitude of the wavevector k is |k|=k=ω/c, and c is the speed of sound. Taking the magnitude of Equation (49) yields:

$$|Y_2(\omega,\theta)| = 4\left|S(\omega)\sin\frac{\omega(T_1+(d_1\cos\theta)/c)}{2}\sin\frac{\omega(T_2+(d_2\cos\theta)/c)}{2}\right|. \quad (50)$$

Now, it is assumed that the spacing and delay are small such that $kd_1, kd_2 \ll \pi$ and $\omega T_1, \omega T_2 \ll \pi$, so that:

$$\begin{aligned} |Y_2(\omega,\theta)| &\approx \omega^2|S(\omega)(T_1+(d_1\cos\theta)/c)(T_2+(d_2\cos\theta)/c)| \\ &\approx k^2|S(\omega)[c^2T_1T_2+c(T_1d_2+T_2d_1)\cos\theta + \\ &\quad d_1d_2\cos^2\theta]|. \end{aligned} \quad (51)$$

The terms inside the brackets in Equation (51) contain the array directional response, composed of a monopole term, a first-order dipole term cos θ that resolves the component of the acoustic particle velocity along the sensor axis, and a linear quadruple term $\cos^2\theta$. One thing to notice in Equation (51) is that the second-order array has a second-order differentiator frequency dependence (i.e., output increases quadratically with frequency). This frequency dependence is compensated in practice by a second-order lowpass filter.

The topology shown in FIG. 19 can be extended to any order as long as the total length of the array is much smaller than the acoustic wavelength of the incoming desired signals. With the small spacing approximation, the response of an $N^{th}$-order differential sensor (N+1 sensors) to incoming plane waves is:

$$|Y_N(\omega,\theta)| \approx \omega^N\left|S(\omega)\prod_{i=1}^{N}[T_i+(d_i\cos\theta)/c]\right|. \quad (52)$$

In the design of differential arrays, the array directivity is of major interest. One possible way to simplify the analysis for the directivity of the $N^{th}$-order array is to define a variable $\alpha_i$ such that:

$$\alpha_i = \frac{T_i}{T_i+d_i/c}. \quad (53)$$

The array response can then be rewritten as:

$$|Y_N(\omega,\theta)| \approx \omega^N \left| S(\omega)\prod_{i=1}^{N}[T_i + d_i/c]\prod_{i=1}^{N}[\alpha_i + (1-\alpha_i)\cos\theta]\right|. \tag{54}$$

The last product term expresses the angular dependence of the array, the terms that precede it determine the sensitivity of the array as a function of frequency, spacing, and time delay. The last product term contains the angular dependence of the array. Now define an output lowpass filter $H_L(\omega)$ as:

$$H_L(\omega) = \left[\omega^N \prod_{i=1}^{N}[T_i + d_i/c]\right]^{-1}. \tag{55}$$

This definition for $H_L(\omega)$ results in a flat frequency response and unity gain for signals arriving from $\theta=0°$. Note that this is true for frequencies and spacings where the small kd approximation is valid. The exact response can be calculated from Equation (50). With the filter described in Equation (55), the output signal is:

$$|X_N(\omega,\theta)| \approx \left| S(\omega)\prod_{i=1}^{N}[\alpha_i + (1-\alpha_i)\cos\theta]\right|. \tag{56}$$

Thus, the directionality of an $N^{th}$-order differential array is the product of N first-order directional responses, which is a restatement of the pattern multiplication theorem in electroacoustics. If the $\alpha_i$ are constrained as $0 \le \alpha_i \le 0.5$, then the directional response of the $N^{th}$-order array shown in Equation (54) contains N zeros (or nulls) at angles between $90° \le \theta \le 180°$. The null locations can be calculated for the $\alpha_i$ as:

$$\begin{aligned}\theta_i &= \arccos\left(\frac{\alpha_i}{\alpha_i - 1}\right) \\ &= \arccos\left(\frac{-T_i c}{d_i}\right).\end{aligned} \tag{57}$$

One possible realization of the second-order adaptive differential array variable time delays $T_1$ and $T_2$ is shown in FIG. 19. This solution generates any time delay less than or equal to $d_i/c$. The computational requirements needed to realize the general delay by interpolation filtering and the resulting adaptive algorithms may be unattractive for an extremely low complexity real-time implementation. Another way to efficiently implement the adaptive differential array is to use an extension of the back-to-back cardioid configuration using a sampling rate whose sampling period is an integer multiple or divisor of the time delay for on-axis acoustic waves to propagate between the microphones, as described earlier.

Figure 20:
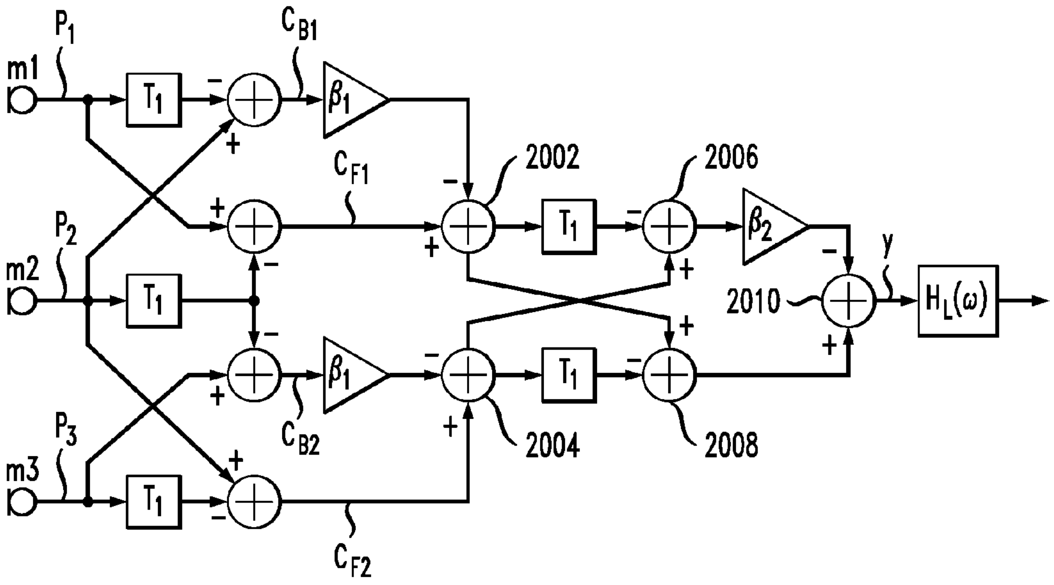
FIG. 20 shows a block diagram of an adaptive second-order array differential microphone utilizing fixed delays and three omnidirectional microphone elements.

FIG. 20 shows a schematic implementation of an adaptive second-order array differential microphone utilizing fixed delays and three omnidirectional microphone elements. The back-to-back cardioid arrangement for a second-order array can be implemented as shown in FIG. 20. This topology can be followed to extend the differential array to any desired order. One simplification utilized here is the assumption that the distance $d_1$ between microphones m1 and m2 is equal to the distance $d_2$ between microphones m2 and m3, although this is not necessary to realize the second-order differential array. This simplification does not limit the design but simplifies the design and analysis. There are some other benefits to the implementation that result by assuming that all $d_1$ are equal. One major benefit is the need for only one unique delay element. For digital signal processing, this delay can be realized as one sampling period, but, since fractional delays are relatively easy to implement, this advantage is not that significant. Furthermore, by setting the sampling period equal to d/c, the back-to-back cardioid microphone outputs can be formed directly. Thus, if one chooses the spacing and the sampling rates appropriately, the desired second-order directional response of the array can be formed by storing only a few sequential sample values from each channel. As previously discussed, the lowpass filter shown following the output y(t) in FIG. 20 is used to compensate the second-order $\omega^2$ differentiator response.

Null Angle Locations

The null angles for the $N^{th}$-order array are at the null locations of each first-order section that constitutes the canonic form. The null location for each section is:

$$\theta_i = \arccos\left(1 - \frac{2}{kd}\arctan\left[\frac{\sin(kd)}{\beta_i + \cos(kd)}\right]\right). \tag{58}$$

Note that, for $\beta_i=1$, $\theta_i=90°$; and, for $\beta_i=0$, $\theta_i=180°$. For small kd ($kd=\omega T \ll \pi$):

$$\theta_i \approx \arccos\left(\frac{\beta_i - 1}{\beta_i + 1}\right). \tag{59}$$

The relationship between $\beta_i$ and the $\alpha_i$ defined in Equation (53) is:

$$\alpha_i = \frac{1-\beta_i}{2}. \tag{60}$$

Least-Squares β for the Second-Order Array

The optimum values of $\beta_i$ are defined here as the values of $\beta_i$ that minimize the mean-square output from the sensor. Starting with a topology that is a straightforward extension to the first-order adaptive differential array developed earlier and shown in FIG. 20, the equations describing the input/output relationship y(t) for the second-order array can be written as:

$$y(t) = c_{FF}(t) - \frac{\beta_1 + \beta_2}{2}c_{TT}(t) - \beta_1\beta_2 c_{BB}(t). \tag{61}$$

where, $$\begin{aligned}c_{TT}(t) &= 2(C_{F2}(t) - C_{F1}(t - T_1)) \\ c_{FF}(t) &= C_{F1}(t) - C_{F2}(t - T_1) \\ c_{BB}(t) &= C_{B1}(t - T_1) - C_{B2}(t)\end{aligned} \tag{62}$$

and where, $$\begin{aligned}C_{F1} &= p_1(t) - p_2(t - T_1) \\ C_{B1} &= p_2(t) - p_1(t - T_1) \\ C_{F2} &= p_2(t) - p_3(t - T_1) \\ C_{B2} &= p_3(t) - p_2(t - T_1).\end{aligned} \tag{63}$$

The terms $C_{F1}(t)$ and $C_{F2}(t)$ are the two signals for the forward facing cardioid outputs formed as shown in FIG. 20. Similarly, $C_{B1}(t)$ and $C_{B2}(t)$ are the corresponding backward facing cardioid signals. The scaling of $C_{TT}$ by a scalar factor of will become clear later on in the derivations. A further simplification can be made to Equation (61) yielding:

$$y(t)=C_{FF}(t)-\alpha_1 c_{BB}(t)-\alpha_2 c_{TT}(t). \quad (64)$$

where the following variable substitutions have been made:

$$\alpha_1 = \beta_1\beta_2 \qquad \alpha_2 = \frac{\beta_1+\beta_2}{2} \quad (65)$$

Figure 21:
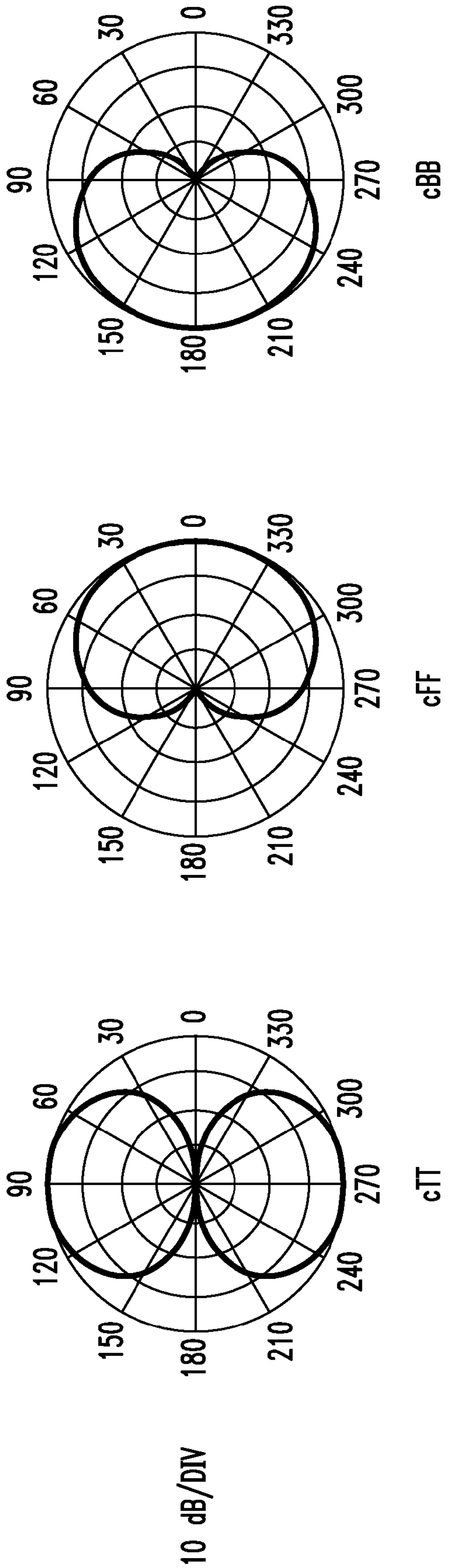
FIG. 21 graphically illustrates the associated directivity patterns of signals $C_{FF}(t)$, $C_{BB}(t)$, and $C_{TT}(t)$ as described in Equation (62)

These results have an appealing intuitive form if one looks at the beam-patterns associated with the signals $c_{FF}(t)$, $c_{BB}(t)$, and $c_{TT}(t)$. These directivity functions are phase aligned relative to the center microphone, i.e., they are all real when the coordinate origin is located at the center of the array. FIG. 21 shows the associated directivity patterns of signals $c_{FF}(t)$, $c_{BB}(t)$, and $c_{TT}(t)$ as described in Equation (62). Note that the second-order dipole plot ($c_{TT}$) is representative of a toroidal pattern (one should think of the pattern as that made by rotating this figure around a line on the page that is along the null axis). From this figure, it can be seen that the second-order adaptive scheme presented here is actually an implementation of a Multiple Sidelobe Canceler (MSLC). See R. A. Monzingo and T. W. Miller, Introduction to Adaptive Arrays, Wiley, New York, (1980), the teachings of which are incorporated herein by reference. The intuitive way to understand the proposed grouping of the terms given in Equation (64) is to note that the beam associated with signal $c_{FF}$ is aimed in the desired source direction. The beams represented by the signals $c_{BB}$ and $c_{TT}$ are then used to place nulls at specific directions by subtracting their output from $c_{FF}$.

The locations of the nulls in the pattern can be found as follows:

$$y(\vartheta) = \frac{1}{4}(1+\cos(\vartheta))^2 - \alpha_1\frac{1}{4}(1-\cos(\vartheta))^2 - \alpha_2\frac{1}{2}\sin^2(\vartheta) = 0 \Rightarrow \vartheta_{1,2} = \arctan\left(\frac{-(1+\alpha_1)\pm\sqrt{\alpha_1+\alpha_2^2}}{1-\alpha_1+2\alpha_2}\right) \quad (66)$$

To find the optimum $\alpha_{1,2}$ values, start with squaring Equation (64):

$$E[y^2(t)]=R_{FF}(0)-2\alpha_1 R_{FB}(0)-2\alpha_2 R_{FT}(0)+2\alpha_1\alpha_2 R_{BT}(0)+\alpha_1^2 R_{BB}(0)+\alpha_2^2 R_{TT}(0). \quad (67)$$

where R are the auto and cross-correlation functions for zero lag between the signals $c_{FF}(t)$, $c_{BB}(t)$, and $C_{TT}(t)$. The extremal values can be found by taking the partial derivatives of Equation (67) with respect to $\alpha_1$ and $\alpha_2$ and setting the resulting equations to zero. The solution for the extrema of this function results in two first-order equations and the optimum values for $\alpha_1$ and $\alpha_2$ are:

$$\alpha_{1opt} = \frac{R_{FB}(0)R_{TT}(0)-R_{BT}(0)R_{FT}(0)}{R_{BB}(0)R_{TT}(0)-R_{BT}(0)^2} \qquad \alpha_{2opt} = \frac{R_{FT}(0)R_{BB}(0)-R_{BT}(0)R_{FB}(0)}{R_{BB}(0)R_{TT}(0)-R_{BT}(0)^2} \quad (70)$$

To simplify the computation of R, the base pattern is written in terms of spherical harmonics. The spherical harmonics possess the desirable property that they are mutually orthonormal, where:

$$c_{FF} = \frac{1}{3}Y_0(\theta,\varphi) + \frac{1}{2\sqrt{3}}Y_1(\theta,\varphi) + \frac{1}{6\sqrt{5}}Y_2(\theta,\varphi)$$
$$c_{BB} = \frac{1}{3}Y_0(\theta,\varphi) - \frac{1}{2\sqrt{3}}Y(\theta,\varphi)_1 + \frac{1}{6\sqrt{5}}Y_2(\theta,\varphi)$$
$$c_{TT} = \frac{1}{3}Y_0(\theta,\varphi) - \frac{1}{3\sqrt{5}}Y_2(\theta,\varphi) \quad (71)$$

where $Y_0(\theta,\phi)$, $Y_1(\theta,\phi)$, and $Y_2(\theta,\phi)$ are the standard spherical harmonics where the spherical harmonics $Y_n^m(\theta,\phi)$ are of degree m and order n. The degree of the spherical harmonics in Equation (71) is 0.

Based on these expressions, the values for the auto- and cross-correlations are:

$$R_{BB} = 1 + \frac{3}{4} + \frac{1}{20} = \frac{18}{10}$$
$$R_{TT} = \frac{12}{10},\ R_{FB} = \frac{12}{10},\ R_{FT} = \frac{12}{10},\ R_{BT} = \frac{12}{10} \quad (72)$$

The patterns were normalized by ⅓ before computing the correlation functions. Substituting the results into Equation (65) yield the optimal values for $\alpha_{1,2}$:

$$\alpha_{1opt} = -\frac{1}{3},\ \alpha_{2opt} = 1 \quad (73)$$

It can be verified that these settings for α result in the second hypercardioid pattern which is known to maximize the directivity index (DI).

In FIG. 20, microphones m1, m2, and m3 are positioned in a one-dimensional (i.e., linear) array, and cardioid signals $C_{F1}$, $C_{B1}$, $C_{F2}$, and $C_{B2}$ are first-order cardioid signals. Note that the output of difference node 2002 is a first-order audio signal analogous to signal y(n) of FIG. 6, where the first and second microphone signals of FIG. 20 correspond to the two microphone signals of FIG. 6. Note further that the output of difference node 2004 is also a first-order audio signal analogous to signal y (n) of FIG. 6, as generated based on the second and third microphone signals of FIG. 20, rather than on the first and second microphone signals.

Moreover, the outputs of difference nodes 2006 and 2008 may be said to be second-order cardioid signals, while output signal y of FIG. 20 is a second-order audio signal corresponding to a second-order beampattern. For certain values of adaptation factors $\beta_1$ and $\beta_2$ (e.g., both negative), the second-order beampattern of FIG. 20 will have no nulls.

Although FIG. 20 shows the same adaptation factor $\beta_1$ applied to both the first backward cardioid signal $C_{B1}$ and the second backward cardioid signal $C_{B2}$, in theory, two different adaptation factors could be applied to those signals. Similarly, although FIG. 20 shows the same delay value $T_1$ being applied by all five delay elements, in theory, up to five different delay values could be applied by those delay elements.

LMS α for the Second-Order Array

The LMS or Stochastic Gradient algorithm is a commonly used adaptive algorithm due to its simplicity and ease of implementation. The LMS algorithm is developed in this section for the second-order adaptive differential array. To begin, recall:

$$y(t)=c_{FF}(t)-\alpha_1 c_{BB}(t)-\alpha_2 c_{TT}(t) \quad (74)$$

The steepest descent algorithm finds a minimum of the error surface $E[y^2(t)]$ by stepping in the direction opposite to the gradient of the surface with respect to the weight parameters $\alpha_1$ and $\alpha_2$. The steepest descent update equation can be written as:

$$\alpha_i(t+1)=a_i(t)-\frac{\mu_i}{2}\frac{\partial E[y^2(t)]}{\partial\alpha_i(t)} \quad (75)$$

where $\mu_i$ is the update step-size and the differential gives the gradient component of the error surface $E[y^2(t)]$ in the $\alpha_i$ direction (the divisor of 2 has been inserted to simplify some of the following expressions). The quantity that is desired to be minimized is the mean of $y^2(t)$ but the LMS algorithm uses an instantaneous estimate of the gradient, i.e., the expectation operation in Equation (75) is not applied and the instantaneous estimate is used instead. Performing the differentiation for the second-order case yields:

$$\frac{dy^2(t)}{d\alpha_1}=[2\alpha_1 c_{BB}(t)-2c_{FF}(t)+2\alpha_2 c_{TT}(t)]c_{BB}(t) \quad (76)$$

$$\frac{dy^2(t)}{d\alpha_2}=[2\alpha_2 c_{TT}(t)-2c_{FF}(t)+2\alpha_1 c_{BB}(t)]c_{TT}(t).$$

Thus the LMS update equation is:

$$\alpha_{1t+1}=\alpha_{it}+\mu_1[\alpha_2 c_{BB}(t)-c_{FF}(t)+\alpha_2 c_{TT}(t)]c_{BB}(t)$$

$$\alpha_{2t+1}=\alpha_{it}+\mu_2[\alpha_2 c_{TT}(t)-c_{FF}(t)+\alpha_1 c_{BB}(t)]c_{TT}(t) \quad (77)$$

Typically, the LMS algorithm is slightly modified by normalizing the update size so that explicit convergence bounds for $\mu_i$ can be stated that are independent of the input power. The LMS version with a normalized $\mu_i$ (NLMS) is therefore:

$$\alpha_{1t+1}=\alpha_{1t}+\mu_1\frac{[\alpha_1 c_{BB}(t)-c_{FF}(t)+\alpha_2 c_{TT}(t)]c_{BB}(t)}{<[c_{BB}(t)^2+c_{TT}(t)^2]>} \quad (78)$$

$$\alpha_{2t+1}=\alpha_{2t}+\mu_2\frac{[\alpha_2 c_{TT}(t)-c_{FF}(t)+\alpha_1 c_{BB}(t)]c_{TT}(t)}{<[c_{BB}(t)^2+c_{TT}(t)^2]>}$$

where the brackets indicate a time average.

A more compact derivation for the update equations can be obtained by defining the following definitions:

$$c=\begin{bmatrix}c_{BB}(t)\\ c_{TT}(t)\end{bmatrix} \quad (79)$$

and $$\alpha=\begin{bmatrix}\alpha_1(t)\\ \alpha_2(t)\end{bmatrix} \quad (80)$$

With these definitions, the output error an be written as (dropping the explicit time dependence):

$$e=c_{FF}-\alpha^T c \quad (81)$$

The normalized update equation is then:

$$\alpha_{t+1}=\alpha_t+\frac{\mu ce}{c^T c+\delta} \quad (82)$$

where $\mu$ is the LMS step size, and $\delta$ is a regularization constant to avoid the potential singularity in the division and controls adaptation when the input power in the second-order back-facing cardioid and toroid are very small.

Since the look direction is known, the adaptation of the array is constrained such that the two independent nulls do not fall in spatial directions that would result in an attenuation of the desired direction relative to all other directions. In practice, this is accomplished by constraining the values for $\alpha_{1,2}$. An intuitive constraint would be to limit the coefficients so that the resulting zeros cannot be in the front half plane. This constraint is can be applied on $\beta_{1,2}$; however, it turns out that it is more involved in strictly applying this constraint on $\alpha_{1,2}$. Another possible constraint would be to limit the coefficients so that the sensitivity to any direction cannot exceed the sensitivity for the look direction. This constraint results in the following limits:

$$-1\le\alpha_{1,2}\le 1$$

Figure 22:
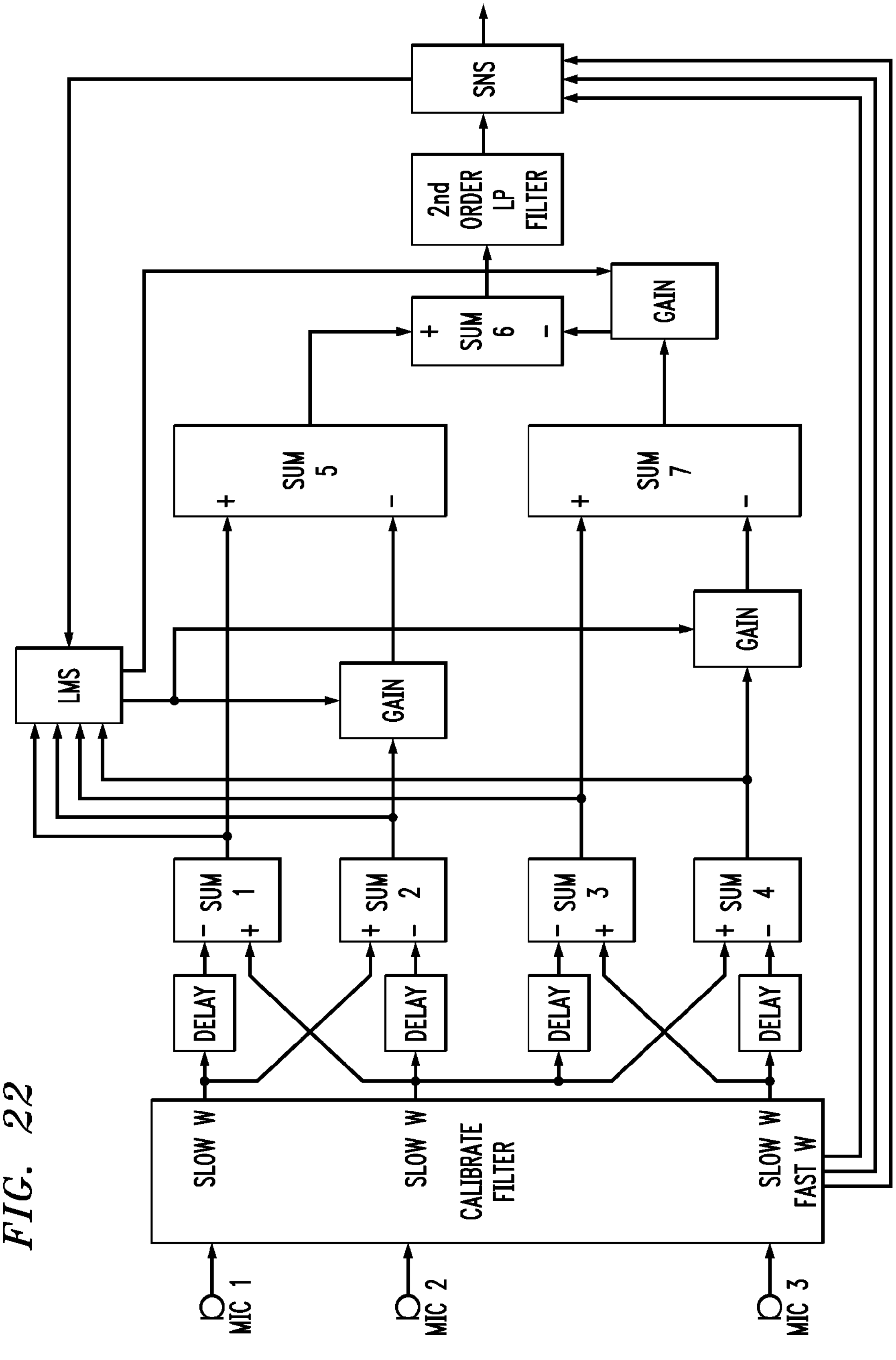
FIG. 22 shows a block diagram of an audio system combining a second-order adaptive microphone with a multichannel spatial noise suppression (SNS) algorithm.

FIG. 22 schematically shows how to combine the second-order adaptive microphone along with a multichannel spatial noise suppression (SNS) algorithm. This is an extension of the first-order adaptive beamformer as described earlier. By following this canonic representation of higher-order differential arrays into cascaded first-order sections, this combined constrained adaptive beamformer and spatial noise suppression architecture can be extended to orders higher than two.

Conclusion

The audio systems of FIGS. 15-18 combine a constrained adaptive first-order differential microphone array with dual-channel wind-noise suppression and spatial noise suppression. The flexible result allows a two-element microphone array to attain directionality as a function of frequency, when wind is absent to minimize undesired acoustic background noise and then to gradually modify the array's operation as wind noise increases. Adding information of the adaptive beamformer coefficient $\beta$ to the input of the parametric dual-channel suppression operation can improve the detection of wind noise and electronic noise in the microphone output. This additional information can be used to modify the noise suppression function to effect a smooth transition from directional to omnidirectional and then to increase suppression as the noise power increases. In the audio system of FIG. 18, the adaptive beamformer operates in the subband domain of the suppression function, thereby advantageously allowing the beampattern to vary over frequency. The ability of the adaptive microphone to automatically operate to minimize sources of undesired spatial, electronic, and wind noise as a function of frequency should be highly desirable in hand-held mobile communication devices.

Although the present invention has been described in the context of an audio system having two omnidirectional microphones, where the microphone signals from those two omni microphones are used to generate forward and backward cardioids signals, the present invention is not so limited. In an alternative embodiment, the two microphones are cardioid microphones oriented such that one cardioid microphone generates the forward cardioid signal, while the other cardioid microphone generates the backward cardioid signal. In other embodiments, forward and backward cardioid signals can be generated from other types of microphones, such as any two general cardioid microphone elements, where the maximum reception of the two elements are aimed in opposite directions. With such an arrangement, the general cardioid signals can be combined by scalar additions to form two back-to-back cardioid microphone signals.

Although the present invention has been described in the context of an audio system in which the adaptation factor is applied to the backward cardioid signal, as in FIG. 6, the present invention can also be implemented in the context of audio systems in which an adaptation factor is applied to the forward cardioid signal, either instead of or in addition to an adaptation factor being applied to the backward cardioid signal.

Although the present invention has been described in the context of an audio system in which the adaptation factor is limited to values between −1 and +1, inclusive, the present invention can, in theory, also be implemented in the context of audio systems in which the value of the adaptation factor is allowed to be less than −1 and/or allowed to be greater than +1.

Although the present invention has been described in the context of systems having two microphones, the present invention can also be implemented using more than two microphones. Note that, in general, the microphones may be arranged in any suitable one-, two-, or even three-dimensional configuration. For instance, the processing could be done with multiple pairs of microphones that are closely spaced and the overall weighting could be a weighted and summed version of the pair-weights as computed in Equation (48). In addition, the multiple coherence function (reference: Bendat and Piersol, "Engineering applications of correlation and spectral analysis", Wiley Interscience, 1993.) could be used to determine the amount of suppression for more than two inputs. The use of the difference-to-sum power ratio can also be extended to higher-order differences. Such a scheme would involve computing higher-order differences between multiple microphone signals and comparing them to lower-order differences and zero-order differences (sums). In general, the maximum order is one less than the total number of microphones, where the microphones are preferably relatively closely spaced.

As used in the claims, the term "power" in intended to cover conventional power metrics as well as other measures of signal level, such as, but not limited to, amplitude and average magnitude. Since power estimation involves some form of time or ensemble averaging, it is clear that one could use different time constants and averaging techniques to smooth the power estimate such as asymmetric fast-attack, slow-decay types of estimators. Aside from averaging the power in various ways, one can also average the ratio of difference and sum signal powers by various time-smoothing techniques to form a smoothed estimate of the ratio.

As used in the claims, the term first-order "cardioid" refers generally to any directional pattern that can be represented as a sum of omnidirectional and dipole components as described in Equation (3). Higher-order cardioids can likewise be represented as multiplicative beamformers as described in Equation (56). The term "forward cardioid signal' corresponds to a beampattern having its main lobe facing forward with a null at least 90 degrees away, while the term "backward cardioid signal" corresponds to a beampattern having its main lobe facing backward with a null at least 90 degrees away.

In a system having more than two microphones, audio signals from a subset of the microphones (e.g., the two microphones having greatest power) could be selected for filtering to compensate for wind noise. This would allow the system to continue to operate even in the event of a complete failure of one (or possibly more) of the microphones.

The present invention can be implemented for a wide variety of applications having noise in audio signals, including, but certainly not limited to, consumer devices such as laptop computers, hearing aids, cell phones, and consumer recording devices such as camcorders. Notwithstanding their relatively small size, individual hearing aids can now be manufactured with two or more sensors and sufficient digital processing power to significantly reduce diffuse spatial noise using the present invention.

Although the present invention has been described in the context of air applications, the present invention can also be applied in other applications, such as underwater applications. The invention can also be useful for removing bending wave vibrations in structures below the coincidence frequency where the propagating wave speed becomes less than the speed of sound in the surrounding air or fluid.

Although the calibration processing of the present invention has been described in the context of audio systems, those skilled in the art will understand that this calibration estimation and correction can be applied to other audio systems in which it is required or even just desirable to use two or more microphones that are matched in amplitude and/or phase.

The present invention may be implemented as analog or digital circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for processing audio signals, comprising:

(a) generating first and second cardioid signals from first and second microphone signals;

(b) generating a first adaptation factor;

(c) applying the first adaptation factor to the second cardioid signal to generate an adapted second cardioid signal; and (d) combining the first cardioid signal and the adapted second cardioid signal to generate a first output audio signal corresponding to a first beampattern having no nulls for at least one value of the first adaptation factor, and (e) applying noise suppression processing to the first output audio signal to generate a noise-suppressed output audio signal, wherein the noise suppression processing is controlled based on the first adaptation factor, wherein:

if the combining of step (d) is subtraction, then the first adaptation factor has a negative value to generate the first output audio signal corresponding to the first beampattern having no nulls; and if the combining of step (d) is addition, then the first adaptation factor has a positive value to generate the first output audio signal corresponding to the first beampattern having no nulls, wherein the method corresponds to one of Scenario A, Scenario B, Scenario C, and Scenario D, such that:

in Scenario A:

the first cardioid signal is a forward cardioid signal;

the second cardioid signal is a backward cardioid signal;

the adapted backward cardioid signal and the forward cardioid signal are subtracted to generate the first output audio signal; and the first beampattern has no nulls for a negative value of the first adaptation factor;

in Scenario B:

the first cardioid signal is a forward cardioid signal;

the second cardioid signal is a backward cardioid signal;

the adapted backward cardioid signal and the forward cardioid signal are added to generate the first output audio signal; and the first beampattern has no nulls for a positive value of the first adaptation factor;

in Scenario C:

the first cardioid signal is a backward cardioid signal;

the second cardioid signal is a forward cardioid signal;

the adapted backward cardioid signal and the forward cardioid signal are subtracted to generate the first output audio signal; and the first beampattern has no nulls for a negative value of the first adaptation factor; and in Scenario D:

the first cardioid signal is a backward cardioid signal;

the second cardioid signal is a forward cardioid signal;

the adapted backward cardioid signal and the forward cardioid signal are added to generate the first output audio signal; and the first beampattern has no nulls for a positive value of the first adaptation factor.

2. The invention of claim 1, wherein:

the first cardioid signal is a forward cardioid signal;

the second cardioid signal is a backward cardioid signal;

the adapted backward cardioid signal is subtracted from the forward cardioid signal to generate the first output audio signal; and the first beampattern has no nulls for negative values of the first adaptation factor.

3. The invention of claim 2, wherein the first beampattern has a null for non-negative values of the first adaptation factor.

4. The invention of claim 2, further comprising:

(f) determining whether a nearfield source is present based on the forward and backward cardioid signals.

5. The invention of claim 4, wherein the nearfield source is determined to be present if a power level of the forward cardioid signal exceeds a power level of the backward cardioid signal by a specified threshold level.

6. The invention of claim 4, wherein the nearfield source is determined to be present based on a comparison of different linear combinations of the forward and backward cardioid signals.

7. The invention of claim 4, wherein the nearfield source is determined to be present based on a comparison of different linear combinations of the first and second microphone signals.

8. The invention of claim 1, wherein the first adaptation factor is generated based on the second cardioid signal and the first output audio signal.

9. The invention of claim 8, wherein the first adaptation factor is updated according to:

$$\beta_{t+1}=\beta_t+2\mu y c_B,$$

wherein:

$\beta_t$ is the first adaptation factor at time t;

$\beta_{t+}$ is the first adaptation factor at time t+1;

$\mu$ is an update step-size;

y is the first output audio signal; and $c_B$ is the second cardioid signal.

10. The invention of claim 9 wherein the first adaptation factor is limited to values from −1 to +1, inclusive.

11. The invention of claim 9, further comprising the steps of:

determining whether a nearfield source is present; and decreasing the update step-size μ to reduce adaptation speed for generating the first output audio signal, if the nearfield source is determined to be present.

12. The invention of claim 1, wherein:

the first and second microphone signals are generated by two omnidirectional microphones; and each cardioid signal is generated by subtracting a delayed version of one microphone signal from another microphone signal.

13. The invention of claim 1, further comprising the step of low-pass filtering the first output audio signal.

14. The invention of claim 1, wherein step (e) comprises:

(1) generating a difference-signal power based on the first and second microphone signals;

(2) generating a sum-signal power based on first and second microphone signals;

(3) generating a power ratio based on the difference-signal power and the sum-signal power;

(4) generating a suppression value based on the power ratio; and (5) applying the noise suppression processing to the first output audio signal based on the suppression value to generate the noise-suppressed output audio signal.

15. The invention of claim 14, wherein the suppression processing is based on both the power ratio and the first adaptation factor.

16. The invention of claim 14, wherein step (b) comprises generating the first adaptation factor based on the power ratio.

17. The invention of claim 16, wherein:

if the power ratio is above a specified threshold, then the first adaptation factor is set equal to a specified value; and if the power ratio is below the specified threshold, then the first adaptation factor is based on the second cardioid signal and the first output audio signal.

18. The invention of claim 17, wherein the specified value implies that the first beampattern is omnidirectional.

19. The invention of claim 14, wherein the difference-signal power and the sum-signal power are generated from the first and second microphone signals.

20. The invention of claim 14, wherein:

the first and second microphone signals are applied to a plurality of time-domain band-pass filters to generate a power ratio value for each band-pass section;

a cutoff frequency is selected based on the plurality of power ratio values; and the first output audio signal is high-pass filtered based on the selected cutoff frequency.

21. The invention of claim 14, wherein the difference-signal power and the sum-signal power are generated by differencing and summing the first and second cardioid signals.

22. The invention of claim 14, wherein step (e) is implemented in a subband domain to generate a suppression level for each subband.

23. The invention of claim 1, wherein steps (b), (c), and (d) are implemented in a subband domain.

24. The invention of claim 23, wherein:

step (a) is implemented in a time domain to generate time-domain first and second cardioid signals; and the time-domain first and second cardioid signals are applied to a subband filterbank to generate subband-domain first and second cardioid signals for steps (b), (c), and (d).

25. The invention of claim 23, wherein:

the first and second microphone signals are applied to a subband filterbank to generate subband-domain microphone signals; and step (a) is implemented in the subband domain to generate subband-domain first and second cardioid signals for steps (b), (c), and (d).

26. The invention of claim 1, wherein step (a) comprises filtering at least one of the first and second microphone signals based on a first weight factor prior to generating the first and second cardioid signals.

27. The invention of claim 26, wherein the first weight factor is generated by:

(1) selecting one microphone signal as a reference signal and another microphone signal as a calibrated signal;

(2) determining an envelope level for each of the first and second microphone signals;

(3) applying a calibration weight factor to the envelope level of the calibrated signal to generate an adjusted calibration-signal envelope level;

(4) updating the calibration weight factor to decrease a difference between the envelope level of the reference signal and the adjusted calibration-signal envelope level; and (5) applying the updated calibration weight factor to a first low-pass filter to generate the first weight factor for the filtering of step (a).

28. The invention of claim 27, further comprising the step of applying the updated calibration weight factor to a second low-pass filter to generate a second weight factor for use in reducing noise in the first output audio signal, wherein the first low-pass filter has a cutoff frequency lower than a cutoff frequency of the second low-pass filter.

29. The invention of claim 28, further comprising the step of applying the updated calibration weight factor to a third low-pass filter to generate a third weight factor for use in detecting presence of any of wind noise, thermal noise, and circuit noise in the first and second microphone signals, wherein the second low-pass filter has a cutoff frequency lower than a cutoff frequency of the third low-pass filter.

30. The invention of claim 27, further comprising:

(6) determining whether any of wind noise, thermal noise, and circuit noise are present in the first and second microphone signals; and (7) determining whether a nearfield source is present, wherein updating of the first weight factor based on the updated calibration weight factor is suspended if any of the wind noise, the thermal noise, and the circuit noise are determined to be present or if the nearfield source is determined to be present.

31. The invention of claim 1, wherein:

the first output audio signal is a first-order signal; and further comprising:

(f) generating third and fourth cardioid signals from one of the first and second microphone signals and a third microphone signal;

(g) generating a second adaptation factor;

(h) applying the second adaptation factor to the fourth cardioid signal to generate an adapted fourth cardioid signal;

(i) combining the third cardioid signal and the adapted fourth cardioid signal to generate a second, first-order output audio signal corresponding to a second beampattern having no nulls for at least one value of the second adaptation factor; and (j) combining the first output audio signal and the second output audio signal to form a second-order output audio signal corresponding to a third beampattern having no nulls for at least one value of the first adaptation factor and at least one value of the second adaptation factor.

32. The invention of claim 31, wherein the first adaptation factor is substantially equal to the second adaptation factor.

33. The invention of claim 31, wherein step (j) comprises:

(1) generating first and second second-order cardioid signals from the first and second first-order output audio signals;

(2) generating a third adaptation factor;

(3) applying the third adaptation factor to the first second-order cardioid signal to generate an adapted first second-order cardioid signal;

(4) combining the second second-order cardioid signal and the adapted first second-order cardioid signal to generate the second-order output audio signal.

34. The invention of claim 33, wherein the first, second, and third adaptation factors are adapted together.

35. The invention of claim 31, wherein the first, second, and third microphone signals are generated by a one-dimensional array of three omnidirectional microphones.

36. The invention of claim 1, further comprise:

(f) determining whether any of wind noise, thermal noise, and circuit noise are present, wherein the generation of the first adaptation factor depends on whether any of the wind noise, the thermal noise, and the circuit noise are determined to be present.

37. The invention of claim 36, wherein:

if the wind noise, the thermal noise, and the circuit noise are determined not to be present, then the first adaptation factor is set equal to a specified value; and if any of the wind noise, the thermal noise, and the circuit noise are determined to be present, then the first adaptation factor is adaptively generated based on the second cardioid signal and the first output audio signal.

38. The invention of claim 1, wherein:

the first cardioid signal is a forward cardioid signal;

the second cardioid signal is a backward cardioid signal;

the adapted backward cardioid signal and the forward cardioid signal are subtracted to generate the first output audio signal; and the first beampattern has no nulls for a negative value of the first adaptation factor.

39. The invention of claim 1, wherein:

the first cardioid signal is a forward cardioid signal;

the second cardioid signal is a backward cardioid signal;

the adapted backward cardioid signal and the forward cardioid signal are added to generate the first output audio signal; and the first beampattern has no nulls for a positive value of the first adaptation factor.

40. The invention of claim 1, wherein:

the first cardioid signal is a backward cardioid signal;

the second cardioid signal is a forward cardioid signal;

the adapted backward cardioid signal and the forward cardioid signal are subtracted to generate the first output audio signal; and the first beampattern has no nulls for a negative value of the first adaptation factor.

41. The invention of claim 1, wherein:

the first cardioid signal is a backward cardioid signal;

the second cardioid signal is a forward cardioid signal;

the adapted backward cardioid signal and the forward cardioid signal are added to generate the first output audio signal; and the first beampattern has no nulls for a positive value of the first adaptation factor.

42. The invention of claim 12, wherein each delayed version is generated by delaying the one microphone signal based on the propagation time between the two omnidirectional microphones for sounds impinging along the microphone pair axis defined by the two omnidirectional microphones.

43. The invention of claim 35, wherein:

each cardioid signal is generated by subtracting a delayed version of one microphone signal of the first, second, and third microphone signals from an other microphone signal of the first, second, and third microphone signals; and each delayed version is generated by delaying the one microphone signal based on a propagation time between the omnidirectional microphones corresponding to the one microphone signal and the other microphone signal for sounds impinging along an axis defined by the two omnidirectional microphones.

44. The invention of claim 1, wherein the first adaptation factor can have any value from −1 to +1, inclusive.

45. A method for processing audio signals, comprising:

(a) generating first and second cardioid signals from first and second microphone signals of first and second omnidirectional microphones based on a microphone signal delay selected to be equal to the propagation time between the first and second omnidirectional microphones for sounds impinging along a microphone pair axis of the first and second omnidirectional microphones;

(b) generating a first adaptation factor;

(c) applying the first adaptation factor to the second cardioid signal to generate an adapted second cardioid signal;

(d) combining the first cardioid signal and the adapted second cardioid signal to generate a first output audio signal corresponding to a first beampattern having no nulls for at least one value of the first adaptation factor; and (e) determining whether a nearfield source is present based on the forward and backward cardioid signals, wherein one of:

the nearfield source is determined to be present if a power level of the forward cardioid signal exceeds a power level of the backward cardioid signal by a specified threshold level;

the nearfield source is determined to be present based on a comparison of different linear combinations of the forward and backward cardioid signals; and the nearfield source is determined to be present based on a comparison of different linear combinations of the first and second microphone signals, wherein:

if the combining of step (d) is subtraction, then the first adaptation factor has a negative value to generate the first output audio signal corresponding to the first beampattern having no nulls; and if the combining of step (d) is addition, then the first adaptation factor has a positive value to generate the first output audio signal corresponding to the first beampattern having no nulls, wherein the method corresponds to one of Scenario A, Scenario B, Scenario C, and Scenario D, such that:

in Scenario A:

the first cardioid signal is a forward cardioid signal;

the second cardioid signal is a backward cardioid signal;

the adapted backward cardioid signal and the forward cardioid signal are subtracted to generate the first output audio signal; and the first beampattern has no nulls for a negative value of the first adaptation factor;

in Scenario B:

the first cardioid signal is a forward cardioid signal;

the second cardioid signal is a backward cardioid signal;

the adapted backward cardioid signal and the forward cardioid signal are added to generate the first output audio signal; and the first beampattern has no nulls for a positive value of the first adaptation factor;

in Scenario C:

the first cardioid signal is a backward cardioid signal;

the second cardioid signal is a forward cardioid signal;

the adapted backward cardioid signal and the forward cardioid signal are subtracted to generate the first output audio signal; and the first beampattern has no nulls for a negative value of the first adaptation factor; and in Scenario D:

the first cardioid signal is a backward cardioid signal;

the second cardioid signal is a forward cardioid signal;

the adapted backward cardioid signal and the forward cardioid signal are added to generate the first output audio signal; and the first beampattern has no nulls for a positive value of the first adaptation factor.

46. The invention of claim 45, wherein the first beampattern has a null for non-negative values of the first adaptation factor.

47. The invention of claim 45, wherein the nearfield source is determined to be present if the power level of the forward cardioid signal exceeds the power level of the backward cardioid signal by the specified threshold level.

48. The invention of claim 45, wherein the nearfield source is determined to be present based on the comparison of the different linear combinations of the forward and backward cardioid signals.

49. The invention of claim 45, wherein the nearfield source is determined to be present based on the comparison of the different linear combinations of the first and second microphone signals.

50. A method for processing audio signals, comprising:

(a) generating first and second cardioid signals from first and second microphone signals of first and second omnidirectional microphones based on a microphone signal delay selected to be equal to the propagation time between the first and second omnidirectional microphones for sounds impinging along a microphone pair axis of the first and second omnidirectional microphones;

(b) generating a first adaptation factor;

(c) applying the first adaptation factor to the second cardioid signal to generate an adapted second cardioid signal; and (d) combining the first cardioid signal and the adapted second cardioid signal to generate a first output audio signal corresponding to a first beampattern having no nulls for at least one value of the first adaptation factor, wherein:

if the combining of step (d) is subtraction, then the first adaptation factor has a negative value to generate the first output audio signal corresponding to the first beampattern having no nulls; and if the combining of step (d) is addition, then the first adaptation factor has a positive value to generate the first output audio signal corresponding to the first beampattern having no nulls, wherein the method corresponds to one of Scenario A, Scenario B, Scenario C, and Scenario D, such that:

in Scenario A:

the first cardioid signal is a forward cardioid signal;

the second cardioid signal is a backward cardioid signal;

the adapted backward cardioid signal and the forward cardioid signal are subtracted to generate the first output audio signal; and the first beampattern has no nulls for a negative value of the first adaptation factor;

in Scenario B:

the first cardioid signal is a forward cardioid signal;

the second cardioid signal is a backward cardioid signal;

the adapted backward cardioid signal and the forward cardioid signal are added to generate the first output audio signal; and the first beampattern has no nulls for a positive value of the first adaptation factor;

in Scenario C:

the first cardioid signal is a backward cardioid signal;

the second cardioid signal is a forward cardioid signal;

the adapted backward cardioid signal and the forward cardioid signal are subtracted to generate the first output audio signal; and the first beampattern has no nulls for a negative value of the first adaptation factor; and in Scenario D:

the first cardioid signal is a backward cardioid signal;

the second cardioid signal is a forward cardioid signal;

the adapted backward cardioid signal and the forward cardioid signal are added to generate the first output audio signal; and the first beampattern has no nulls for a positive value of the first adaptation factor;

the first adaptation factor is updated according to:

$$\beta_{t+1}=\beta_t+2\mu y c_B,$$

wherein:

$\beta_t$ is the first adaptation factor at time t;

$\beta_{t+}$ is the first adaptation factor at time t+1;

μ is an update step-size;

y is the first output audio signal; and $c_B$ is the second cardioid signal.

further comprising the steps of:

determining whether a nearfield source is present; and decreasing the update step-size μ to reduce adaptation speed for generating the first output audio signal, if the nearfield source is determined to be present.

51. The invention of claim 50, wherein the first adaptation factor is limited to values from −1 to +1, inclusive.

52. A method for processing audio signals, comprising:

(a) generating first and second cardioid signals from first and second microphone signals of first and second omnidirectional microphones based on a microphone signal delay selected to be equal to the propagation time between the first and second omnidirectional microphones for sounds impinging along a microphone pair axis of the first and second omnidirectional microphones;

(b) generating a first adaptation factor;

(c) applying the first adaptation factor to the second cardioid signal to generate an adapted second cardioid signal;

(d) combining the first cardioid signal and the adapted second cardioid signal to generate a first output audio signal corresponding to a first beampattern having no nulls for at least one value of the first adaptation factor; and (e) applying noise suppression processing to the first output audio signal to generate a noise-suppressed output audio signal, wherein step (e) comprises:

(1) generating a difference-signal power based on the first and second microphone signals;

(2) generating a sum-signal power based on first and second microphone signals;

(3) generating a power ratio based on the difference-signal power and the sum-signal power;

(4) generating a suppression value based on the power ratio; and (5) applying the noise suppression processing to the first output audio signal based on the suppression value to generate the noise-suppressed output audio signal, wherein:

if the combining of step (d) is subtraction, then the first adaptation factor has a negative value to generate the first output audio signal corresponding to the first beampattern having no nulls; and if the combining of step (d) is addition, then the first adaptation factor has a positive value to generate the first output audio signal corresponding to the first beampattern having no nulls, wherein the method corresponds to one of Scenario A, Scenario B, Scenario C, and Scenario D, such that:

in Scenario A:

the first cardioid signal is a forward cardioid signal;

the second cardioid signal is a backward cardioid signal;

the adapted backward cardioid signal and the forward cardioid signal are subtracted to generate the first output audio signal; and the first beampattern has no nulls for a negative value of the first adaptation factor;

in Scenario B:

the first cardioid signal is a forward cardioid signal;

the second cardioid signal is a backward cardioid signal;

the adapted backward cardioid signal and the forward cardioid signal are added to generate the first output audio signal; and the first beampattern has no nulls for a positive value of the first adaptation factor;

in Scenario C:

the first cardioid signal is a backward cardioid signal;

the second cardioid signal is a forward cardioid signal;

the adapted backward cardioid signal and the forward cardioid signal are subtracted to generate the first output audio signal; and the first beampattern has no nulls for a negative value of the first adaptation factor; and in Scenario D:

the first cardioid signal is a backward cardioid signal;

the second cardioid signal is a forward cardioid signal;

the adapted backward cardioid signal and the forward cardioid signal are added to generate the first output audio signal; and the first beampattern has no nulls for a positive value of the first adaptation factor.

53. The invention of claim 52, wherein the suppression processing is based on both the power ratio and the first adaptation factor.

54. The invention of claim 52, wherein step (b) comprises generating the first adaptation factor based on the power ratio.

55. The invention of claim 54, wherein:

if the power ratio is above a specified threshold, then the first adaptation factor is set equal to a specified value; and if the power ratio is below the specified threshold, then the first adaptation factor is based on the second cardioid signal and the first output audio signal.

* * * * *

UNITED STATES PATENT AND TRADEMARK OFFICE

CERTIFICATE OF CORRECTION

PATENT NO. : 8,942,387 B2
APPLICATION NO. : 12/281447
DATED : January 27, 2015
INVENTOR(S) : Gary W. Elko et al.

It is certified that error appears in the above-identified patent and that said Letters Patent is hereby corrected as shown below:

In the claims,

- In column 31, line 19, replace "(a) generating first and second cardioid signals from first and second microphone signals;" with --(a) generating first and second cardioid signals from first and second microphone signals of first and second omnidirectional microphones based on a microphone signal delay selected to be equal to the propagation time between the first and second omnidirectional microphones for sounds impinging along a microphone pair axis of the first and second omnidirectional microphones;--.

- In column 38, line 22, replace "$\beta_{t+}$" with --$\beta_{t+1}$--.

Signed and Sealed this
Fifth Day of January, 2016

Michelle K. Lee
*Director of the United States Patent and Trademark Office*